US012504061B2

(12) United States Patent
Hu et al.

(10) Patent No.: US 12,504,061 B2
(45) Date of Patent: Dec. 23, 2025

(54) ELECTRIC DRIVE MODULE AND ELECTRIC DRIVE EQUIPMENT FOR REDUCING VIBRATION

(71) Applicant: Shenzhen Pengxing Intelligent Research Co., Ltd., Shenzhen (CN)

(72) Inventors: Qian-Lan Hu, Shenzhen (CN); Ning Hua, Shenzhen (CN); Liang Xiong, Shenzhen (CN); Tong-Yang Zhao, Shenzhen (CN); Qian Zhao, Shenzhen (CN); Xiao-Ben Ye, Shenzhen (CN); Zhuo-Lin Liu, Shenzhen (CN); Teng Chen, Shenzhen (CN)

(73) Assignee: Shenzhen Pengxing Intelligent Research Co., Ltd., Shenzhen (CN)

( * ) Notice: Subject to any disclaimer, the term of this patent is extended or adjusted under 35 U.S.C. 154(b) by 527 days.

(21) Appl. No.: 17/955,908

(22) Filed: Sep. 29, 2022

(65) Prior Publication Data

US 2023/0193989 A1 Jun. 22, 2023

(30) Foreign Application Priority Data

Sep. 30, 2021 (CN) .......................... 202111165636.8
Aug. 10, 2022 (CN) .......................... 202210954181.6

(51) Int. Cl.
*H02K 11/215* (2016.01)
*B25J 9/12* (2006.01)
(Continued)

(52) U.S. Cl.
CPC .............. *F16H 49/001* (2013.01); *B25J 9/12* (2013.01); *F16H 57/0412* (2013.01);
(Continued)

(58) Field of Classification Search
None
See application file for complete search history.

(56) References Cited

U.S. PATENT DOCUMENTS

2011/0245006 A1 * 10/2011 Negishi .................. B25J 9/1025
74/411
2013/0324342 A1 * 12/2013 Onozaki .............. B60K 17/356
475/150
(Continued)

FOREIGN PATENT DOCUMENTS

CN 211565962 U * 9/2020
JP S6096978 U2 7/1985
(Continued)

OTHER PUBLICATIONS

Machine translation of CN-211565962-U (Year: 2020).*

*Primary Examiner* — Bernard Rojas
(74) *Attorney, Agent, or Firm* — ScienBiziP, P.C.

(57) ABSTRACT

An electric drive module and an electric drive equipment are provided, the electric drive module comprises a housing, a force output assembly, a flexible gear, a rotor, a stator, a wave generator, and a cooling pipe, the stator is configured to drive the rotor to rotate relative to the housing, when the rotor rotates, the wave generator drives the flexible gear to deform to drive the rigid gear to rotate, at least part of the cooling pipe is received in and closes to the stator. The electric drive module is compact and space saving, the flexible gear is secured to the housing, the rotation of the rigid gear driven by the deformation of the flexible outputs power, which is low rotational inertia and decreases vibration, the cooling pipe arranged in the stator can directly dissipate heat from the stator with high heat dissipation efficiency.

15 Claims, 14 Drawing Sheets

(51) Int. Cl.

| | |
|---|---|
| *F16H 49/00* | (2006.01) |
| *F16H 57/04* | (2010.01) |
| *H02K 5/20* | (2006.01) |
| *H02K 7/08* | (2006.01) |
| *H02K 7/116* | (2006.01) |
| *H02K 9/19* | (2006.01) |
| *H02K 11/24* | (2016.01) |
| *F16H 57/02* | (2012.01) |

(52) U.S. Cl.
CPC ......... *F16H 57/0476* (2013.01); *H02K 5/203* (2021.01); *H02K 7/088* (2013.01); *H02K 7/116* (2013.01); *H02K 9/19* (2013.01); *H02K 11/215* (2016.01); *H02K 11/24* (2016.01); *F16H 2049/003* (2013.01); *F16H 2057/02034* (2013.01); *H02K 2211/03* (2013.01)

(56) References Cited

U.S. PATENT DOCUMENTS

| | | |
|---|---|---|
| 2018/0355964 A1 | 12/2018 | Otsuka et al. |
| 2019/0203825 A1 | 7/2019 | Yamauchi et al. |

FOREIGN PATENT DOCUMENTS

| | | |
|---|---|---|
| JP | 2019-118195 A | 7/2019 |
| WO | 2016/024340 A1 | 2/2016 |

\* cited by examiner ns. It should be noted that the description is illustrative only and is not intended to limit the scope of the disclosure. Additionally, the description is only intended to show the structure of the components of the drawings more clearly, and the sizes, proportions, and quantities of the components may be different from those of the actual structure.

ELECTRIC DRIVE MODULE AND ELECTRIC DRIVE EQUIPMENT FOR REDUCING VIBRATION

CROSS-REFERENCE TO RELATED APPLICATIONS

This application claims priority to Chinese Patent Application No. 202111165636.8 filed on Sep. 30, 2021 and Chinese Patent Application No. 202210954181.6 filed on Aug. 10, 2022 in China National Intellectual Property Administration, the contents of which are incorporated by reference herein.

FIELD

The subject matter herein generally relates to mechanotransduction technology, and particularly to an electric drive module and an electric drive equipment.

BACKGROUND

An electric drive module is a core component of a robot, particularly in a mobile robot where small size and low weight are required, but sudden strength of motion is also needed. In robotics, an electrical motor and a harmonic reducer are used for driving joints of the robot. In related technology, the electrical motor and the harmonic reducer are normally in series, axial dimension is increased, which can result in the joints of the robot having a large size and occupying such space that mobility and dexterity of the robot can be affected. For instance, the joints of the robot can easily touch external objects when moving, meanwhile the robot with large joints can be detrimental to the overall appearance of the robot. In addition, the related technology normally uses as output a flexible gear of the harmonic reducer, with great rotational inertia and vibration. The present electrical motor of the joints of the robot is heat dissipation by natural means or heat being dissipated by fan, when the heat generated by the electric drive module is great, the heat dissipation function cannot meet requirements. The present disclosure provides an electric drive module resolving the abovementioned problems.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
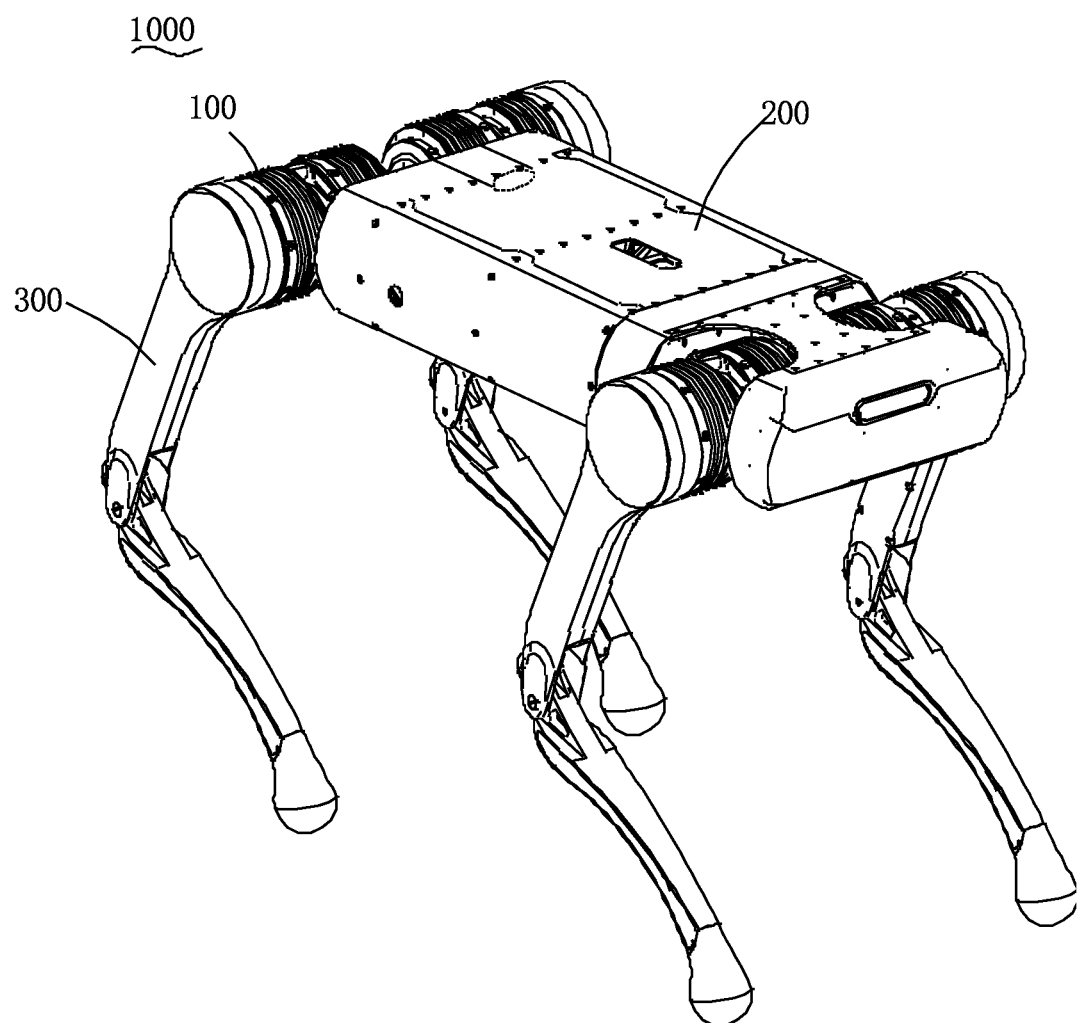
FIG. 1 illustrates a schematic diagram of at least one embodiment of an electric drive equipment according to the present disclosure.
Figure 2:
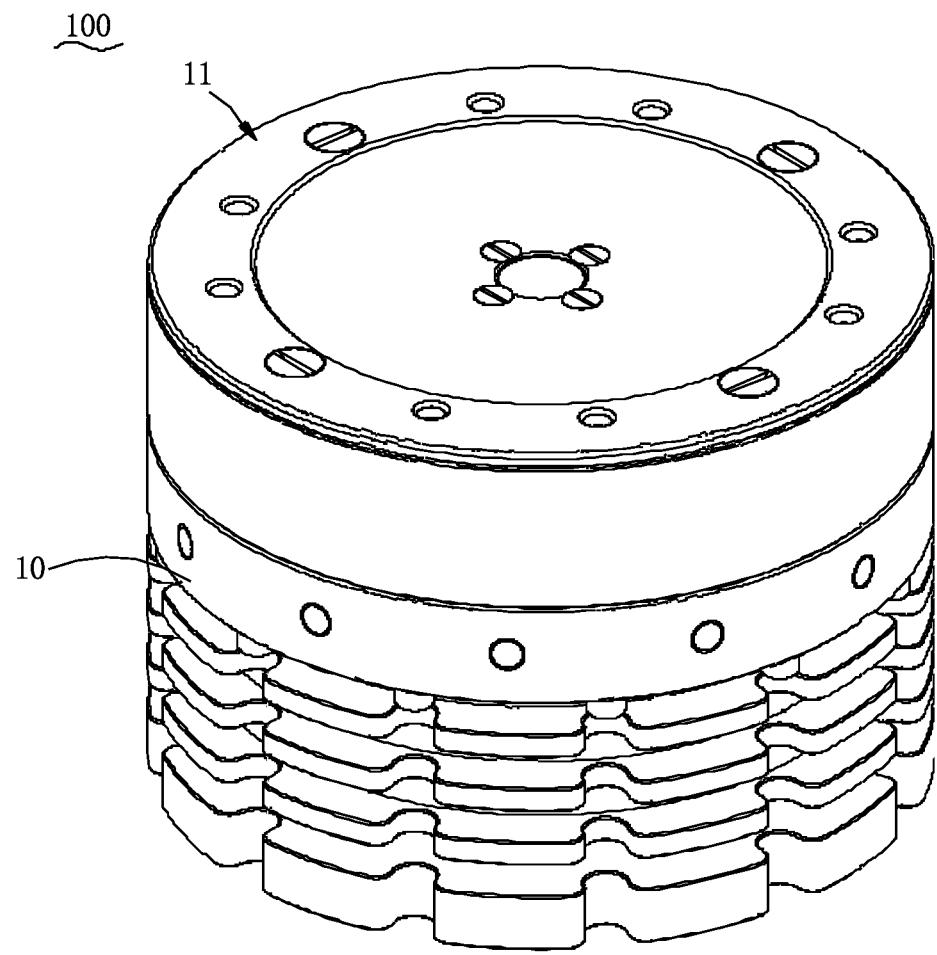
FIG. 2 illustrates a schematic diagram of at least one embodiment of an electric drive module according to the present disclosure.

Implementations of the disclosure will now be described, by way of embodiments only, with reference to the drawings. The disclosure is illustrative only, and changes can be made in the detail within the principles of the present disclosure. It will, therefore, be appreciated that the embodiments can be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape or other word that the term modifies, such that the component need not be exact. The term "comprising," when utilized, means "including, but not necessarily limited to", it specifically indicates open-ended inclusion or membership in the so-described combination, group, series, and the like.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which are only for the convenience of describing the present disclosure and to simplify the description, rather than indicating or implying that the device or element referred to must have a specific orientation, or be constructed and operated in a specific orientation, so the above terms should not be understood as limiting the present disclosure.

It can be understood that the term "a" should be understood as "at least one" or "one or more", that is, in one embodiment, the number of an element can be one, and in another embodiment, the number of the elements can be more than one, and the term "one" cannot be taken as a restriction on actual number.

FIG. 1 illustrates a schematic diagram of at least one embodiment of an electric drive equipment 1000 including an electric drive module 100. The electric drive equipment 1000 can be a four-footed robot, such as a robot dog, a robot horse, etc. The electric drive equipment 1000 can be other type of robot, such as a two-footed robot, a six-footed robot, etc. In addition, the electric drive equipment 1000 is not limited to robots, but can comprise other types of equipment, which is limited in the present disclosure.

Setting a four-footed robot as an example, the electric drive module 100 of the present disclosure can be mounted to joints of the robot and configured to drive the joints to rotate. In detail, the robot can comprise a body 200 and four feet 300 connected to the body 200. The electric drive module 100 is configured to drive the feet 300 to move relative to the body 200. For instance, the electric drive module 100 can be configured to drive all the feet 300 to move relative to the body 200, or drive individual joints of the feet 300 to move.

Referring to FIG. 2 to FIG. 5, the electric drive module 100 of the present disclosure comprises a housing 10, a force output assembly 11, a flexible gear 12, a stator 13, a rotor 14, a magnet 15, and a wave generator 16. The housing 10 comprises an opening 101 and a receiving chamber 102. The force output assembly 11 can rotate relative to the housing 10. The force output assembly 11 comprises a rigid gear 111, the rigid gear 111 is arranged in the opening 101.

At least part of the flexible gear 12 is arranged in the receiving chamber 102 and dynamically coupled to the rigid gear 111. The flexible gear 12 is further fixedly connected to the housing 10. At least part of the rotor 14 is rotatably mounted in the receiving chamber 102. The magnet 15 is arranged on the rotor 14. The stator 13 is fixedly mounted in the receiving chamber 102, at least part of the stator 13 is received in the rotor 14, the stator 13 and the magnet 15 are spaced apart relatively. That is, the rotor 14 is rotatably mounted in the receiving chamber 102 and on the outside of the stator 13, the rotor 14 and the rigid gear 111 can rotate coaxially.

Figure 4:
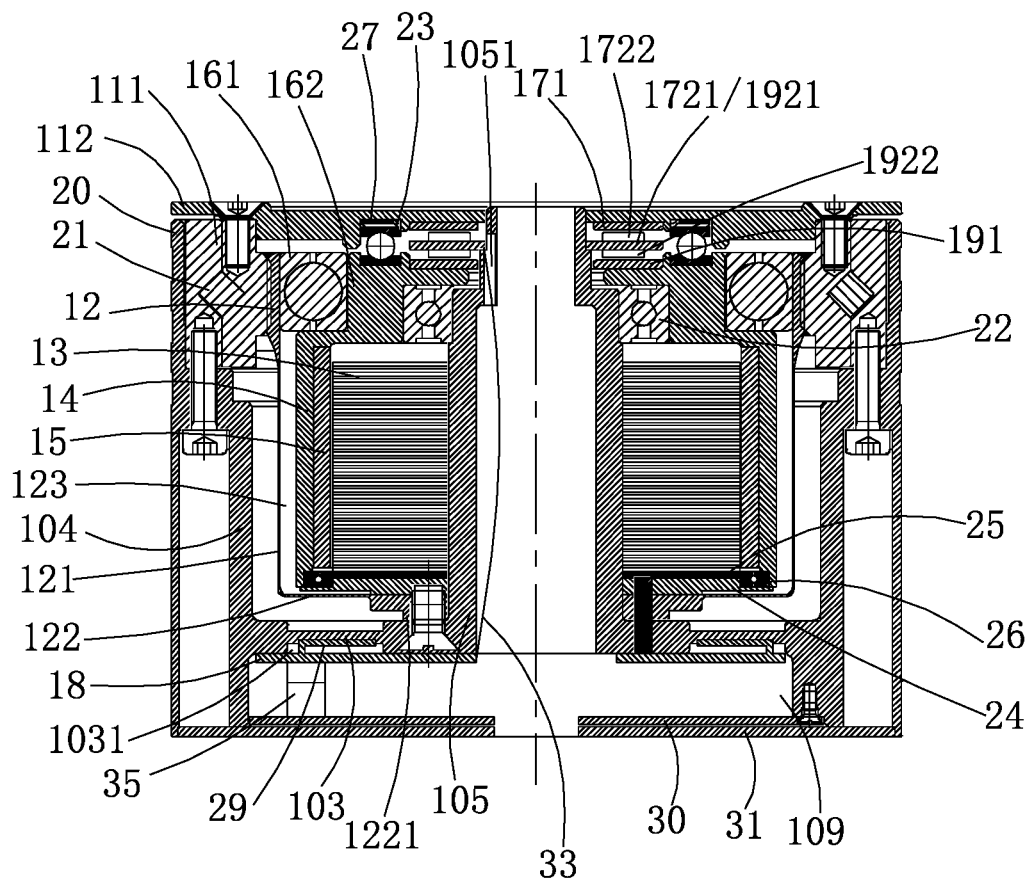
FIG. 4 illustrates a cross-sectional schematic diagram of at least one embodiment of the electric drive module according to the present disclosure.

Referring FIG. 4, the stator 13 is fixedly mounted in the receiving chamber 102 and at least part of the stator 13 is received in the rotor 14. It should be known that an inner wall of the rotor 14 surrounds an annular space, the stator 13 is arranged on the inner side of the inner wall of the rotor 14 and at least part of the rotor 14 is positioned in the annular space.

Figure 6:
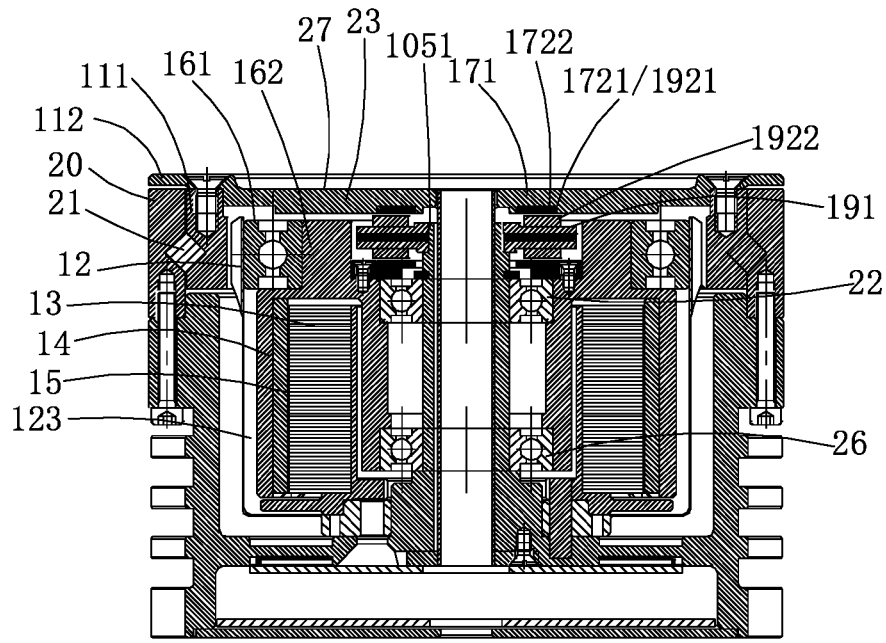
FIG. 6 illustrates another cross-sectional schematic diagram of at least one embodiment of the electric drive module according to the present disclosure.

Referring to FIG. 6, in at least one embodiment, the inner wall of the rotor 14 forms a receiving chamber, at least part of the stator 13 is received in the receiving chamber (as shown in FIG. 6), the arrangement of the stator 13 can be adjusted according to the actual situation.

The wave generator 16 comprises a flexible bearing 161 and a cam 162. The flexible bearing 161 is arranged between the flexible gear 12 and the cam 162. The cam 162 is detachably mounted on the rotor 14 or integrated with the rotor 14.

The stator 13 is configured to drive the rotor 14 to rotate relative to the housing 10. When the rotor 14 rotates, the wave generator 16 drives the flexible gear 12 to deform to drive the rigid gear 111 to rotate.

It should be known that the electric drive module is a core component of the robot, particularly in a mobile robot with legs, small size and low weight are required, meanwhile great explosive output force is also needed. In robotics, an electrical motor and a harmonic reducer are used for driving joints of the robot. In related technology, the electrical motor and the harmonic reducer normally set in series, but then an axial dimension is increased, which can cause oversize joints of the robot and occupy more space that can further affect the movement of the robot. For instance, large joints of the robot can easily touch external objects when moving, meanwhile large joints of the robot can affect an overall appearance of the robot. In addition, the related technology normally uses a flexible gear of the harmonic reducer as an output, leading to larger moment of inertia and larger vibration.

In the electric drive module 100 and the electric drive equipment 1000 of the present disclosure, at least part of the flexible gear 12 is arranged in the receiving chamber 102 and dynamically coupled to the rigid gear 111. At least part of the stator 13 is fixedly mounted in the receiving chamber 102. The rotor 14 is rotatably mounted in the receiving chamber 102 and positioned on the outside of the stator 13, the rotor 14 and the rigid gear 111 can rotate coaxially. The flexible bearing 161 is arranged between the flexible gear 12 and the cam 162. The cam 162 is detachably mounted on the rotor 14 and integrated with the rotor 14. Thus, at least part of the flexible gear 12 is arranged in the receiving chamber 102, the stator 13 and the rotor 14 are received in the receiving chamber 102, the cam 162 is mounted on the rotor 14 or integrated with the rotor 14, which decreases the overall size of the electric drive module 100. Meanwhile, the flexible gear 12 and the housing 10 are fixed, outputting force by the rotation of the rigid gear 111 driven by the deformation of the flexible gear 12, which has low rotational inertia and decreases the vibration effectively.

In detail, in at least one embodiment, after the stator 13 is powered up, the stator 13 drives the rotor 14 to rotate, so as to rotate to drive the wave generator 16 to rotate to make the deform of the flexible gear 12, driving the rigid gear 111 to rotate to output force.

The housing 10 as a supporter component of the electric drive module 100, should be made of metal material or non-metal material with high strength for strong support. The electric drive module 100 can be mounted to a main body of the electric drive equipment 1000 through the housing 10, for instance, the electric drive module 100 can be mounted to the body 300 of the robot through a mounting hole of the housing 10.

Figure 5:
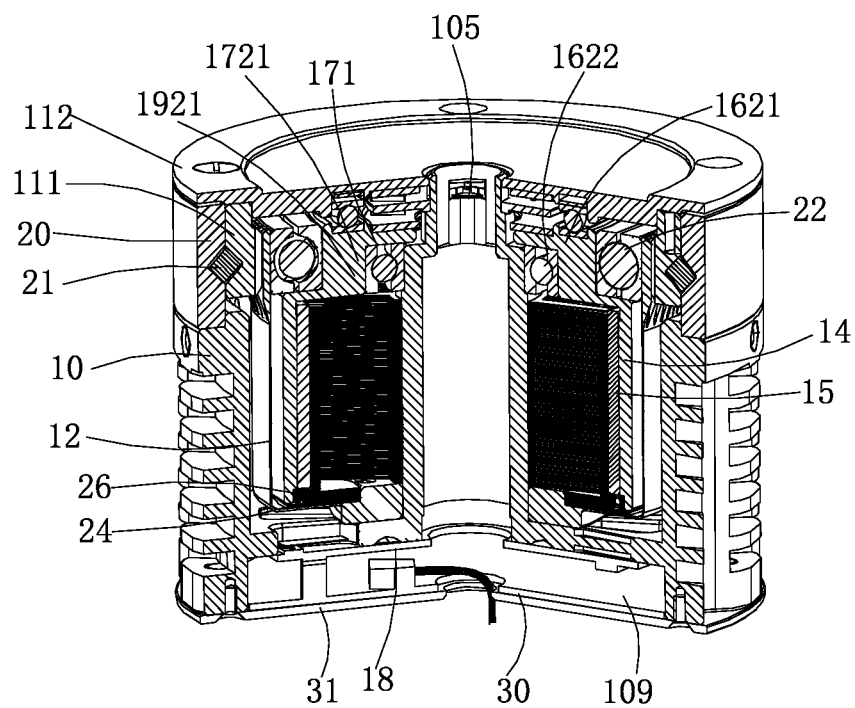
FIG. 5 illustrates another cross-sectional schematic diagram of at least one embodiment of the electric drive module according to the present disclosure.

The housing 10 is provided with an opening 101 on a top portion. The rigid gear 111 is arranged near the opening 101. It means the rigid gear 111 is arranged close to the opening 101, the rigid gear 111 can be positioned on the outside of the opening 101, that is positioned externally to the receiving chamber 102, or can be positioned internally to the opening 101, that is fully or partially positioned in the receiving chamber 102, not being limited by the present disclosure. In FIGS. 4 and 5, the rigid gear 111 is shown to be positioned externally to the opening 101 and the receiving chamber 102.

In detail, the housing 10 can comprise an enclosure wall 104 and a bottom wall 103 connected to the enclosure wall 104. The enclosure wall 104 and the bottom wall 103 cooperatively enclose the receiving chamber 102. In at least one embodiment, the enclosure wall 104 can be a hollow structure for improving heat dissipating efficiency, such as the enclosure wall 104 defining a number of heat dissipating holes (not shown) for dissipating heat from heat generating components such as the stator 13 arranged in the housing 10. For heat dissipating purpose and preventing external dust and foreign matter entering the inner wall of the electric drive module 100, a dust prevention structure can be arranged on the hollow area of the enclosure wall 104, this can be a dust-catching gauze. Thus, high heat dissipating efficiency and prevention against ingress of dust and other contaminants of the electric drive module 100 can be achieved.

In the present disclosure, the stator 13 and the rotor 14 can function as a drive motor. The stator 13 and the rotor 14 in the receiving chamber 102 can be equivalent to the drive motor being arranged in the housing 10, which can efficiently decrease the size of the whole electric drive module 100. In at least one embodiment, the rotor 14 can be arranged externally to the stator 13, equivalent to an external rotor drive motor.

A plurality of magnets 15 is also disclosed. The magnets 15 can be circumferentially located on the rotor 14 at intervals. In at least one embodiment, the magnets 15 can be attached to the rotor 14 by glue. In other embodiments, for improving a stability of the magnets 15, the rotor 14 can be provided with some mounting grooves for mounting the magnets 15 by glue, which is not limited by the present disclosure.

Referring to FIG. 4, in at least one embodiment, the flexible gear 12 comprises a mounting chamber 123, at least part of the rotor 14 and the stator 13 are received in the mounting chamber 123.

Therefore, at least part of the flexible gear 12 is received in the receiving chamber 102 of the housing 10, at least part of the rotor 14 and the stator 13 are received in the mounting chamber 123 of the flexible gear 12, which increases compactness of the electric drive module 100 and decreases the overall size of the electric drive module 100.

In at least one embodiment, at least part of the flexible gear 12 is received in the housing 10, and at least part of the rotor 14 and the stator 13 are received in the mounting chamber 123 of the flexible gear 12; thus, the flexible gear 12, the stator 13, and the rotor 14 are arranged successively in radial direction, increasing compactness of the electric drive module 100 and decreasing the overall size of the electric drive module 100.

In detail, referring to FIG. 4 to FIG. 10, in at least one embodiment, the flexible gear 12 can comprise a flexible wall 121 and a mounting wall 122 connected to the flexible wall 121. The flexible wall 121 extends along the axial direction of the rotation of the rotor 14, the flexible wall 121 is dynamically coupled to the rigid gear 111. The mounting wall 122 is fixed to the housing 10. The flexible wall 121 and the mounting wall 122 cooperatively form the mounting chamber 123, and the rotor 14 and the stator 13 are fully received in the mounting chamber 123. Thus, the rotor 14 and the stator 13 are fully received in the mounting chamber 123 of the flexible gear 12, which further decreases the size of the electric drive module 100.

Figure 7:
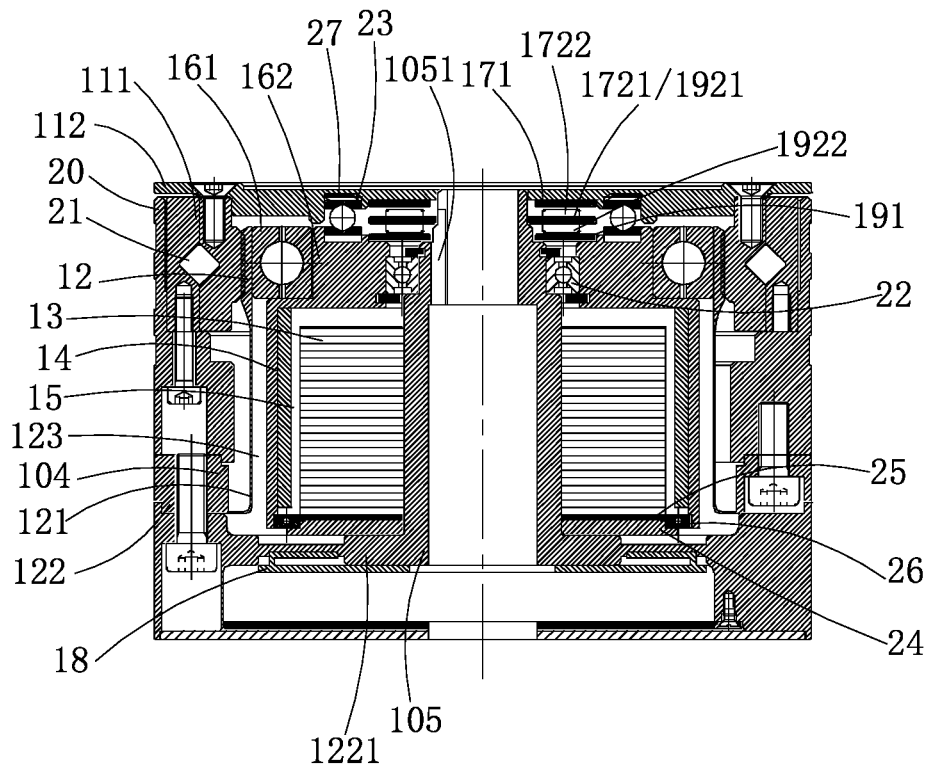
FIG. 7 illustrates another cross-sectional schematic diagram of at least one embodiment of the electric drive module according to the present disclosure.
Figure 8:
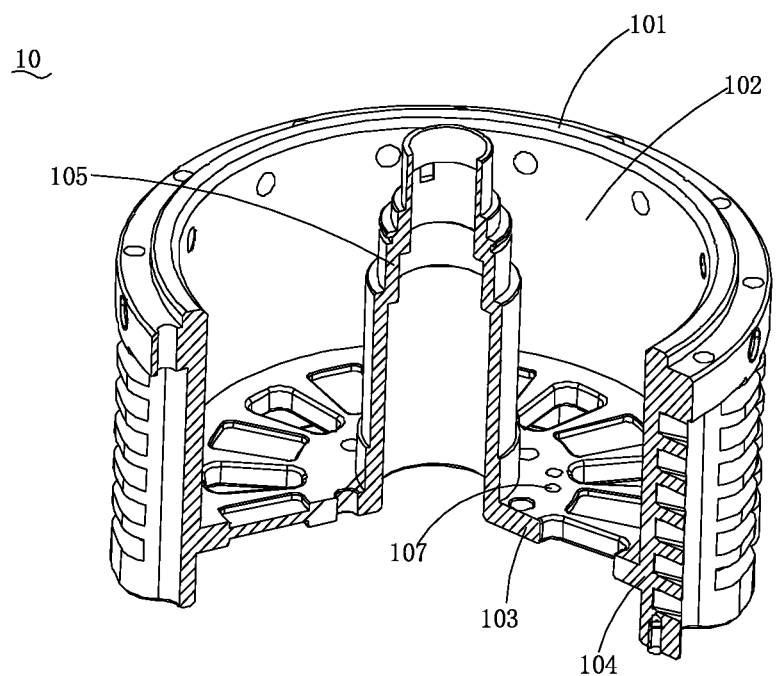
FIG. 8 illustrates a schematic diagram of at least one embodiment of a housing of the electric drive module according to the present disclosure.
Figure 9:
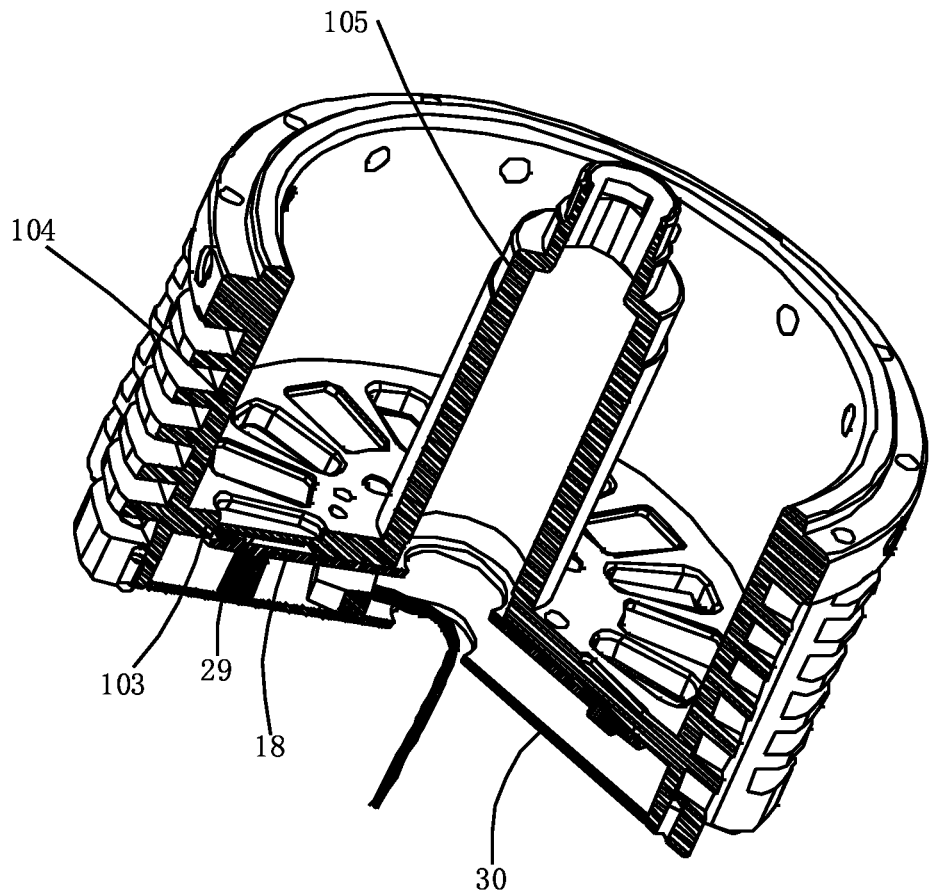
FIG. 9 illustrates a schematic diagram of at least one embodiment of the housing, a first circuit board, and a drive circuit board of the electric drive module according to the present disclosure.

Referring to FIGS. 4, 7, and 8, in at least one embodiment, the housing 10 comprises the enclosure wall 104, a central shaft 105, and the bottom wall 103. The enclosure wall 104 and the bottom wall 103 cooperatively enclose the receiving chamber 102. The mounting wall 122 can be fixedly connected to at least one of the enclosure wall 104, the bottom wall 103, and the central shaft 105. Thus, the flexible gear 12 can be fixedly connected to the housing 10.

Figure 10:
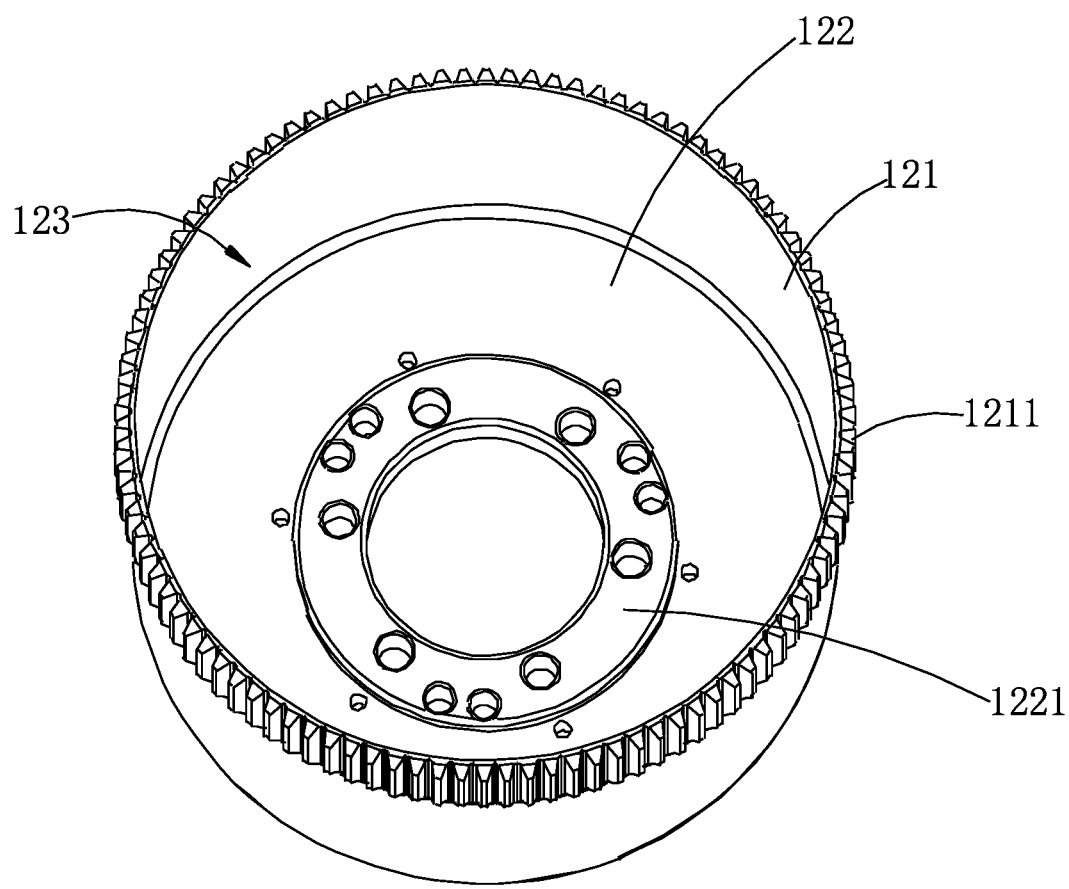
FIG. 10 illustrates a schematic diagram of at least one embodiment of a flexible gear of the electric drive module according to the present disclosure.

In detail, referring to FIGS. 4, 5, and 10, in at least one embodiment, the flexible gear 12 is substantially cup-shaped, the flexible wall 121 extends along the axial direction of the rotation of the rotor 14, that is extending along the rotating axis of the rotor 14. The mounting wall 122 is connected to the bottom portion of the flexible wall 121 and inwardly extends with bent along the radial direction, that is the mounting wall 122 extends with bent towards the side of the rotating axis of the rotor 14 relative to the flexible wall 121. The mounting wall 122 is provided with holes for inserting fasteners, such as bolts, screws, pins, etc., for being fixedly mounted to the housing 10.

More specifically, for facilitating deformation of the flexible wall 121, the thickness of the flexible wall 121 can be relatively thin. The mounting wall 122 can comprise a thick mounting protrusion 1221 on the end, the mounting protrusion 1221 is arranged on the central shaft 105. The mounting wall 122 can be fixedly connected to the housing 10 through the mounting protrusion 1221. The thickness of the mounting protrusion 1221 must ensure sufficient strength in the connection between the flexible gear 12 and the housing 10. In this situation, the mounting protrusion 1221 can be provided with holes for inserting fasteners, such as bolts, screws, pins, etc., for fixedly mounting the mounting protrusion 1221 to the housing 10.

In other embodiments, the flexible gear 12 can exclude the mounting wall 122 or directly extend the mounting wall 122 along the axial direction of the rotation of the rotor 14 and fixedly connected to the bottom wall 103. In this situation, the flexible gear 12 can be substantially cylindrical.

Referring to FIG. 7, in other embodiments, the flexible gear 12 can be substantially hat shaped. The mounting wall 122 can extend outwardly with bent along the radial direction of the flexible wall 121, that is the mounting wall 121 is bent and extends towards the side away from the rotation axis of rotor 14 with respect to the flexible wall 121. In this situation, the flexible wall 121 can form the mounting chamber 123 by itself, at least part of the stator 13 and the rotor 14 can be received in the mounting chamber 123.

In detail, in at least one embodiment, the housing 10 can be a sectional housing 10, which can comprise the first portion and the second portion arranged up and down. The second portion is above the first portion. The mounting wall 122 can comprise an annular mounting portion 1221 mounted between the first portion and the second portion. In this situation, the first portion, the second portion, and the annular mounting portion 1221 cooperatively form the receiving chamber 102.

In the present disclosure, the central shaft 105 can be formed in the central position of the bottom wall 103, the rotor 14 can rotatably connected to the central shaft 105 and can rotate relative to the central shaft 105. For instance, there can be a supporting bearing between the central shaft 105 and the rotor 14, the supporting bearing can support the rotor 14 and allow rotation of the rotor 14.

To ensure that the flexible gear 12 can deform sufficiently under the drive of the wave generator 16, the mounting wall 122 can preferably connected to the bottom wall 103. Thus, the length of the flexible wall 121 can be increased, so the flexible wall 121 can fully deform when driven by the wave generator 16.

Figure 3:
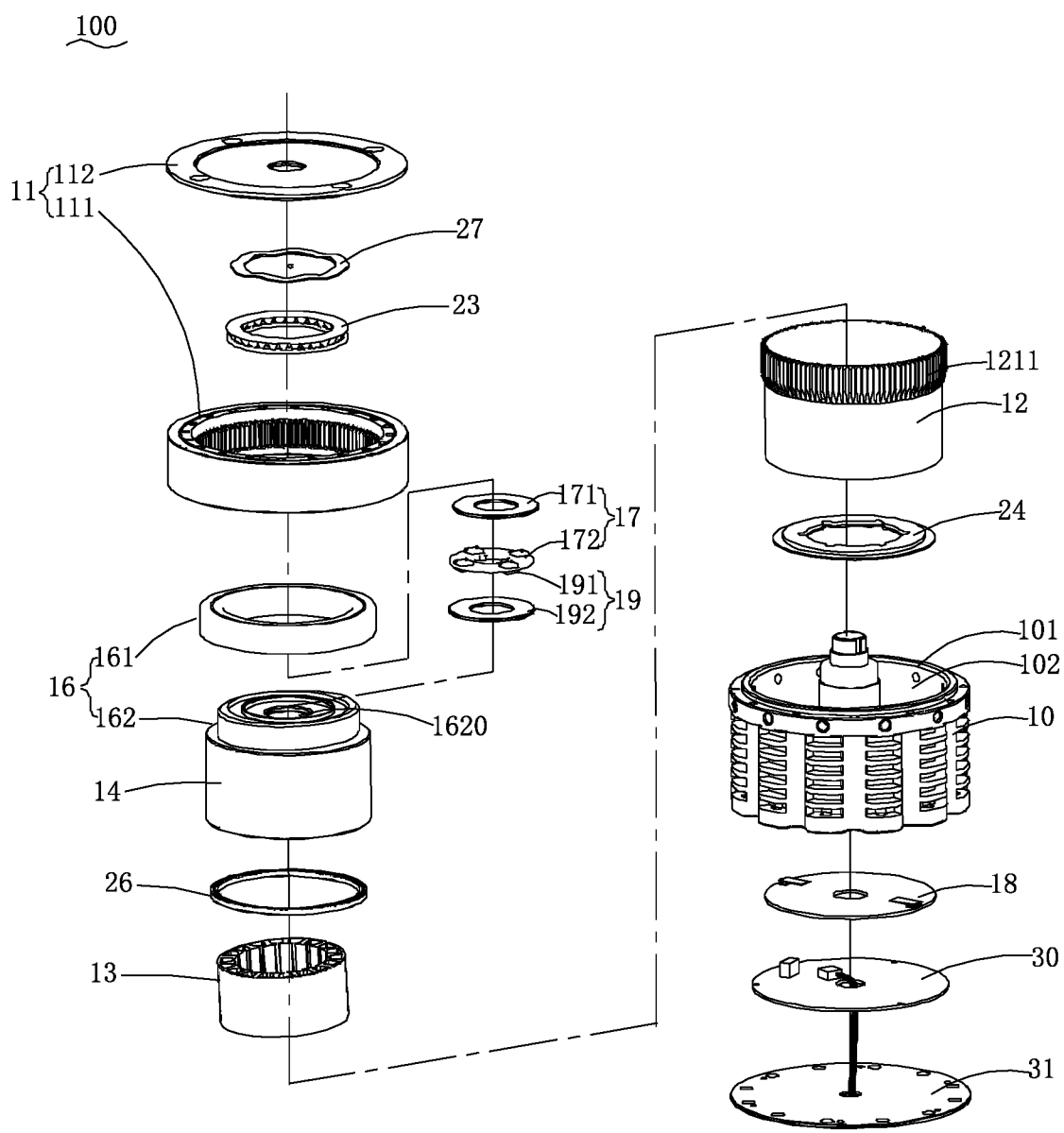
FIG. 3 illustrates an exploded schematic diagram of at least one embodiment of the electric drive module according to the present disclosure.
Figure 12:
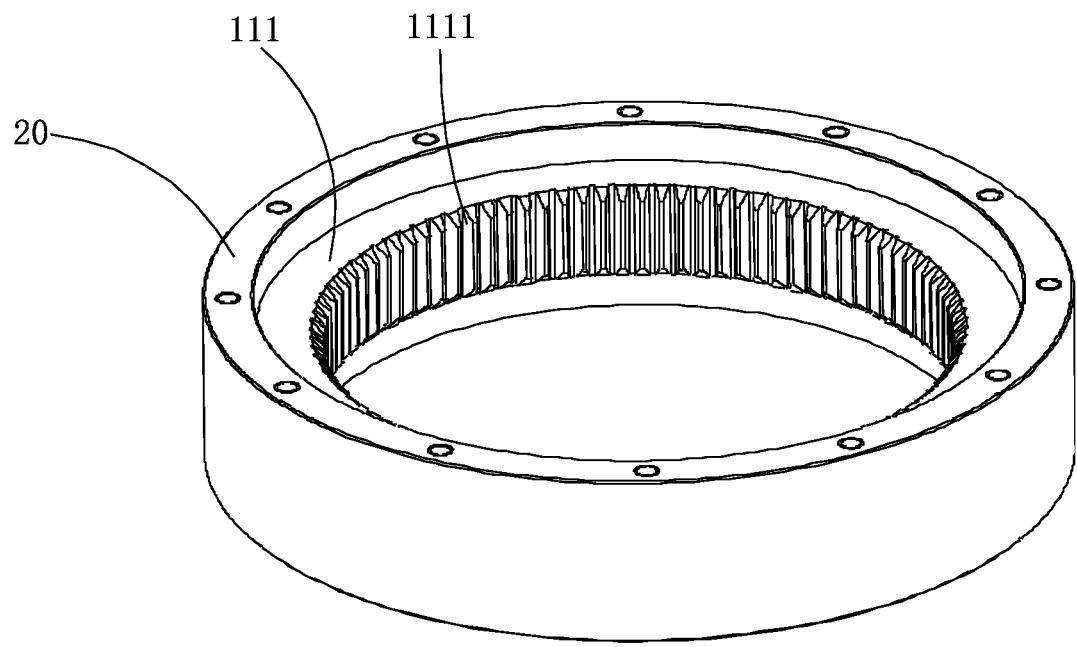
FIG. 12 illustrates a schematic diagram of at least one embodiment of a rigid gear and a supporter of the electric drive module according to the present disclosure.

Referring to FIGS. 3 and 12, in at least one embodiment, the inner peripheral surface of the rigid gear 111 forms a first gear ring 1111. The flexible gear 12 comprises the mounting wall 122 and the flexible wall 121. The mounting wall 122 is fixedly connected to the housing 10. The flexible wall 121 have a second gear ring 1211 which is formed on the circumferential surface opposite the first gear ring 1111 of the rigid wheel 111. At least part of the first gear ring 1111 engages with the second gear ring 1211, so the flexible gear 12 and the rigid gear 111 can be coupled. The number of teeth of the second gear ring 1211 is less than the number of teeth of the first gear ring 1111.

Thus, through the partially engagement of the first gear ring 1111 and the second gear ring 1211, the deformation of the flexible wall 121 drives the rigid gear 111 to rotate to output force.

In at least one embodiment, the cam 162 is detachably mounted on the rotor 14 or integrated with the rotor 14, the outline of an orthographic projection of the cam 162 on the radial direction of the rotation of the rotor 14 can be oval.

Thus, the oval cam 162 and the flexible bearing 161 form the wave generator 16. When the rotor 14 rotates, the cam 162 can periodically drive the flexible gear 12 to deform, so the flexible gear 12 can drive the rigid gear 111 to rotate.

In detail, in at least one embodiment, the cam 162 is detachably mounted on the rotor 14 through fasteners, such as bolts, screws, pins, etc. or integrated with the rotor 14, the outline of the cam 162 is oval, the rotating axis of the cam 162 coincides with the rotating axis of the rotor 14, the rotor 14 can drive the cam 162 to rotate when rotating, the cam 162 can drive the flexible gear 12 to deform through the flexible bearing 161, so the rigid gear 111 can rotate relative to the housing 10 to output force.

Referring to FIGS. 3 to 6, in at least one embodiment, the electric drive module 100 further comprises a first position detection assembly 17. At least part of the first position detection assembly 17 is received in the annular chamber 1620 which is formed by the cam 162 or arranged on the side of the wave generator 16 away from the stator 13. The first position detection assembly 17 is configured to detect rotation position information of the force output assembly 11.

Thus, the rotation position and rotating speed of the force output assembly 11 is obtained accurately through the first position detection assembly 17. For more precisely control, the first position detection assembly 17 can be received in the receiving chamber 102, which can further save the mounting space of the housing 10 and decrease the overall size of the electric drive module 100.

In at least one embodiment, the statement "the first position detection assembly 17 is arranged on the side of the wave generator 16 away from the stator 13" means that the side of the wave generator 16 away from the stator 14 comprises at least one surface, the first position detection assembly 17 is arranged in the space formed by the plane of the at least one surface of the wave generator 16 towards the direction away from the stator 13, the space comprises the area covered by the axial projection of the wave generator 16, or the area not covered by the axial projection of the wave generator 16. That is, the stator 13 and the first position detection assembly 17 are respectively arranged on the opposite sides of the wave generator 16 along the axial direction.

The first position detection assembly 17 and the rotor 14 are on opposite sides of the cam 162, that is, the first position detection assembly 17 is positioned on top of the wave generator 16.

In detail, the first position detection assembly 17 comprises a first magnetic piece 171 and a first sensing piece 172. The first magnetic piece 171 is fixedly connected to the force output assembly 11, the first sensing piece 172 is fixedly connected to the housing 10, the first sensing piece 172 and the first magnetic piece 171 are spaced apart relatively.

Furthermore, in at least one embodiment, the cam 162 can be hollow and annular in shape, at least part of the first position detection assembly 17 can be received in the annular chamber 1620 of the cam 162, which can further decrease the stack space along the axial direction of the electric drive module 100 to decrease the overall size of the electric drive module 100. The first position detection assembly 17 and the stator 13 are spaced apart relatively from each other by the cam 162 and the rotor 14. On one hand, this prevents the concentration of heat from local overheating, on the other hand, when the stator 13 is working, separating the first position detection assembly 17 and the stator 13 can prevent generation of magnetic field which might affect the detecting precision of the first position detection assembly 17. In other embodiments, at least part of the first position detection assembly 17 can be received in the annular chamber 1620, at least part of the first position detection assembly 17 protrudes from the annular chamber 1620 to the side away from the rotor 14.

In the present disclosure, the first magnetic piece 171 can be a magnetic ring or a magnet. The first sensing piece 172 can be hall detector, when the force output assembly 11 rotates, the first magnetic piece 171 can rotate according to the rotation of the force output assembly 11, the hall detector can detect the position of the first magnetic piece 171 and the rotation position of the force output assembly 11, so as to calculate the rotating speed of the force output assembly 11 according to the rotation position.

Referring to FIGS. 4, 5, 7, and 8, in at least one embodiment, the housing 10 comprises the central shaft 105, the first sensing piece 172 is arranged on the central shaft 105, and the central shaft 105 is provided with a wire slot 1051. The wire slot 1051 can be provided with throughout the entire central shaft 105 or can be directly penetrate from the central shaft 105 after passing through a part of the central shaft 105. The first sensing piece 172 can be electrically connected to a first circuit board 18 through connecting wire 33 received in the wire slot 1051.

Thus, the central shaft 105 can be used to support and install the first sensing piece 172, meanwhile, the first sensing piece 172 can be electrically connected to a first circuit board 18 through connecting wire 33 received in the wire slot 1051, so the first circuit board 18 can provide power for the first sensing piece 172, saving wiring space and decreasing the size of the electric drive module 100.

In details, the first circuit board 18 can be a drive circuit board of the stator 13. The first circuit board 18 can be arranged on the inside or outside of the bottom wall 104 of the housing 10, such as shown in FIG. 4, the housing 10 forms a receiving space 109 under the bottom wall 104, the first circuit board 18 can be mounted in the receiving space 109 for protection. Additionally, a drive circuit board 30 can be mounted on an external surface of the bottom wall 103, the drive circuit board 30 can be electrically connected with the first circuit board 18 by plugging. The drive circuit board 30 can be electrically connected with a processor of the electric drive equipment 1000. The drive circuit board 30 can receive control instructions from the processor to control the energization of the stator 13 and thus control the speed of the rotor 13.

The first sensing piece 172 can be fixedly mounted on the central shaft 105, for powering the first sensing piece 172, the connecting wires 33 connecting the first sensing piece 172 can be electrically connected with the first circuit board 18 installed at the bottom of the housing 10 through the wire slot 1051 and the central shaft 105, so the first sensing piece 172 can transmit the position data to the first circuit board 18 and the drive circuit board 30, so the processor can obtain real time rotation position and rotating speed.

Referring to FIGS. 5 to 7, in at least one embodiment, the first sensing piece 172 comprises a second circuit board 1721 and a first sensing unit 1722, the first sensing unit 1722 is electrically connected to the second circuit board 1721. The first sensing unit 1722 and the first magnetic piece 171 are set at intervals. The second circuit board 1721 is arranged on the central shaft 105, the second circuit board 1721 is electrically connected with the first circuit board 18 through the connecting wires 33 received in the wire slot 1051. It should be known that, setting at intervals is used to make the first sensing unit 1722 and the first magnetic piece 171 close to each other, so the first sensing unit 1722 can detect the position of the first magnetic piece 171, so as to calculate the rotating speed of the first magnetic piece 171, that is the rotating speed of the rotor 14.

Thus, the second circuit board 1721 is arranged on the central shaft 105, the first sensing unit 1722 can be arranged on the circuit board, the first sensing unit 1722 can cooperate with the first magnetic piece 171 to detect the rotation position of the force output assembly 11. The second circuit board 1721 can be electrically connected to the first circuit board 18 under the housing 10 through the connecting wires 33 received in the wire slot 1051, for powering supply to the first sensing unit 1722.

In detail, in at least one embodiment, the first sensing unit 1722 can be magnetic chip, the second circuit board 1721 can be chip circuit board. The number of the first sensing units 1722 can be single or multiple, the first magnetic piece 171 can be an annular magnet or a magnet. For instance, when the first magnetic piece 171 is an annular magnet, there can be one magnetic chip, when the first magnetic piece 171 rotates with the force output assembly 11, the magnetic chip can obtain the rotation position of the annular magnet. For example, when the first magnetic piece 171 is a magnet, the number of the first sensing units 1722 is multiple, a plurality of first sensing units 1722 can be arranged on the second circuit board 1721 in a circular interval, so that when the first magnetic piece 171 rotates with the force output assembly 11, the plurality of first sensing units 1722 can detect rotation position of the first magnetic piece 171, so as to detect the position of the force output assembly 11.

In at least one embodiment, the first magnetic piece 171 can only comprise the first sensing units 1722, and not comprise the second circuit board 1721. Thus, the first magnetic piece 171 can be directly arranged on the central shaft 105 of the housing 10, and then is electrically connected to the first circuit board 18 under the housing 10 through the connecting wires 33 received in the wire slot 1051, so as to power supply and transmit signals to the first sensing units 1722.

Referring to FIGS. 3 to 7, in at least one embodiment, the electric drive module 100 further comprises a second position detection assembly 19. The second position detection assembly 19 is mounted in the receiving chamber 102, the second position detection assembly 19 is arranged on the side of the first position detection assembly 17 facing the direction of the stator 13. The second position detection assembly 19 comprises a second magnetic piece 191 and a second sensing piece 192. The second magnetic piece 191 is fixedly connected to the rotor 14 and rotates with the rotor 14 synchronously. The second sensing piece 192 is fixedly connected to the housing 10, the second sensing piece 192 and the second magnetic piece 191 are spaced apart relatively. The second sensing piece 192 is configured to detect the rotation position of the second magnetic piece 191.

The statement "The second position detection assembly 19 is arranged on the side of the first position detection assembly 17 facing the direction of the stator 13" means that, along the axial direction, the stator 13, the second position detection assembly 19, and the first position detection assembly 17 are at intervals and arranged in turn. The second position detection assembly 19 is positioned between the first position detection assembly 17 and the stator 13. The second position detection assembly 19 can be arranged in a space formed by the first position detection assembly 17 facing the direction of the stator 13, the space comprises an area covered by the axial projection of the first position detection assembly 17, or an area being not covered by the axial projection of the first position detection assembly 17.

Thus, obtaining the rotation position and rotating speed of the rotor 14 through the second position detection assembly 19 enables more accurate control, that is, input detection is realized. The second position detection assembly 19 is arranged in the receiving chamber 102, further save the mounting space of the housing 10 and decrease the size of the electric drive module 100.

In detail, in at least one embodiment, at least part of the second position detection assembly 19 can be received in the annular chamber 1620 of the cam 162 and is positioned under the first position detection assembly 17, so as to further decrease the stack space along the axial direction of the electric drive module 100 and decrease the size of the electric drive module 100. The second position detection assembly 19 and the stator 13 are separated by the cam 162 and the rotor 14. On one hand, local overheating caused by heat source concentration is prevented, on the other hand, separating the second position detection assembly 19 and the stator 13 can prevent magnetic field generated by the stator 13 during operation from affecting the precision of the second position detection assembly 19.

In at least one embodiment, the second position detection assembly 19 can be received in other positions of the receiving chamber 102. For instance, in one embodiment, the second position detection assembly 19 can be arranged inside or outside of the rotor 14, which is not limited.

Furthermore, in at least one embodiment, the second sensing piece 192 can be arranged on the central shaft 105, the second sensing piece 192 is electrically connected to the first circuit board 18 through connecting wires received in the wire slot 1051.

Furthermore, in at least one embodiment, the second sensing piece 192 comprises a third circuit board 1921 and a second sensing unit 1922, the second sensing unit 1922 is electrically connected to the third circuit board 1921. The third circuit board 1921 and the second sensing unit 1922 are spaced apart relatively. The third circuit board 1921 is fixedly connected to the housing 10.

In detail, in at least one embodiment, as the second circuit board 1721, the third circuit board 1921 is also arranged on the central shaft 105, the third circuit board 1921 can be stacked with the second circuit board 1721. The third circuit board 1921 can be electrically connected to the first circuit board 18 through the connecting wires received in the wire slot 1051. Thus, by stacking the third circuit board 1921 and the second circuit board 1721 in the annular chamber 1620 of the cam 162, axial space can be saved. In addition, referring to FIG. 4, the second circuit board 1721 and the third circuit board 1921 can be the same circuit board, that is, the second circuit board 1721 and the third circuit board 1921 can be integrated as a double-faced circuit board, the first sensing unit 1722 and the second sensing unit 1922 being arranged on opposite sides of the double-faced circuit board. Certainly, in at least one embodiment, there can be two separate stacked circuit boards set to supply power and transmit signals to the first sensing unit 1722 and the second sensing unit 1922. In this situation, the second circuit board 1721 and the third circuit board 1921 can be separated by a clapboard (not shown), the first sensing unit 1722 and the second sensing unit 1922 are insulated and each isolated, the two circuit boards can be electrically connected to the first circuit board 18 through their own wires.

In addition, as in the case of the first magnetic piece 171, the second magnetic piece 191 can also be an annular magnet or a magnet, the specific structure is the same as that of the first magnetic piece 171, and omitting repeat description here. Meanwhile, as in the case of the first sensing unit 1722, the second sensing unit 1922 can also be a magnet chip, the number of second sensing unit 1922 can also be single or multiple. One or more second sensing units 1922 can be annularly arranged on the third circuit board 1921 at intervals, and when the second magnetic piece 191 rotates, a plurality of second sensing units 1922 can cooperate to detect rotation positions of the second magnetic piece 191, so as to detect the rotation position of the rotor 14.

Referring to FIGS. 3-5 and 10, in at least one embodiment, the electric drive module 100 further comprises a supporter 20 arranged near the opening 101. At least part of the rigid gear 111 is arranged on the inner side of the supporter 20. Rolling piece 21 is arranged between the rigid gear 111 and the supporter 20. The rigid gear 111 can rotate relative to the supporter 20. The supporter 20 is detachably connected to the housing 10.

Thus, the supporter 20 supports the rotation of the rigid gear 111 and provides reaction force to the rigid gear 111, the supporter 20 can effectively counteract the force exerted by the external load on the rigid gear 111 from all directions and improve stability of the rotation.

Figure 11:
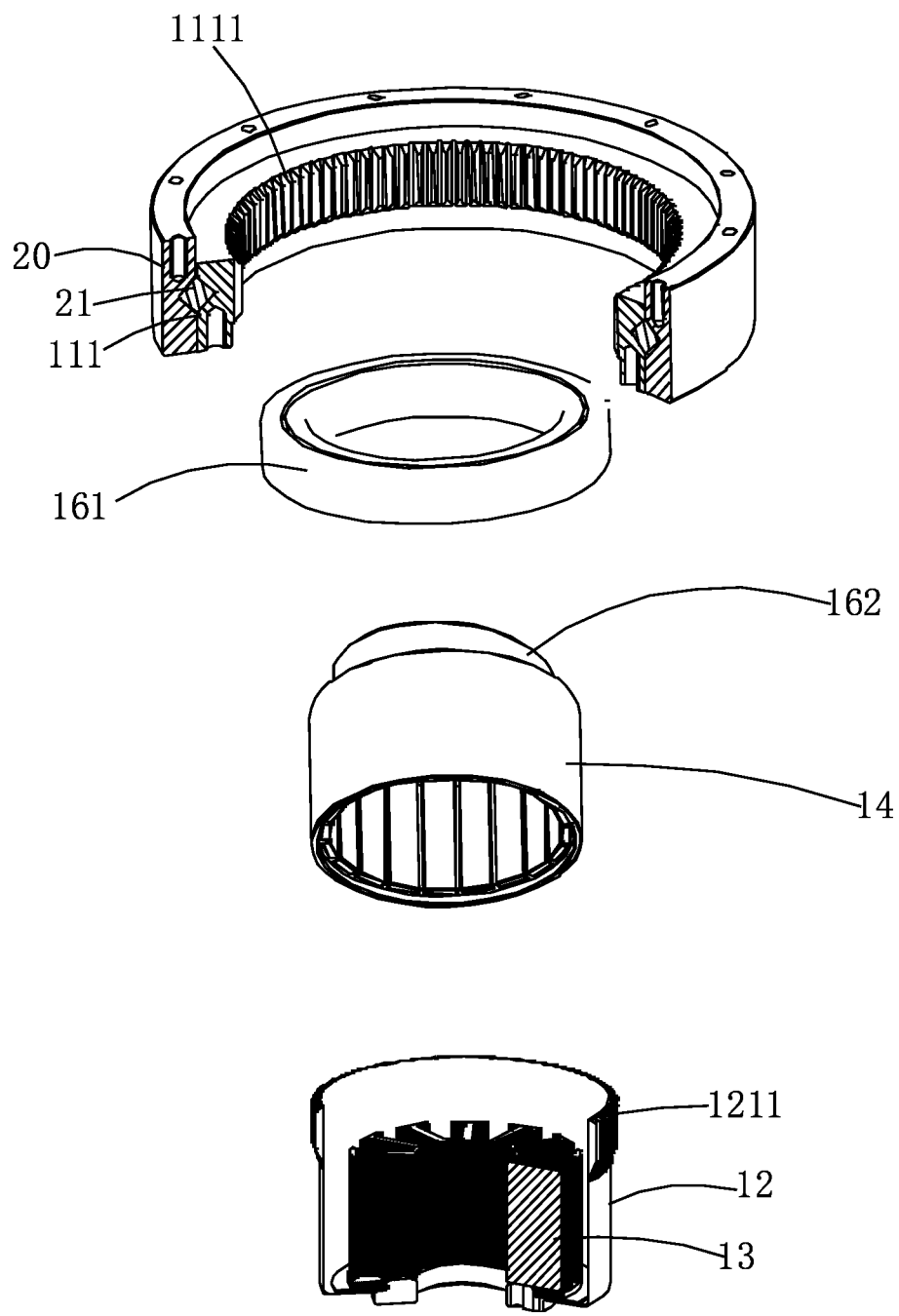
FIG. 11 illustrates a partial assembled schematic diagram of at least one embodiment of the electric drive module according to the present disclosure.

In detail, referring to FIGS. 10 and 11, in at least one embodiment, the supporter 20, the rigid gear 111, and the rolling piece 21 can be equivalent to a bearing, wherein the supporter 20 can be equivalent to the outer ring of the bearing, the rigid gear 111 can be equivalent to the inner ring of the bearing, and the rolling piece 21 can be equivalent to balls or rollers of the bearing, forming the second gear ring 1211 on the inner side of the rigid gear 111, to realize force coupling with the flexible gear 12. Meanwhile, the supporter 20 and the rolling piece 21 are arranged to support the rotation of the rigid gear 111, thus the extra supporting bearing for supporting the rotation of the rigid gear 111 may not be required, saving components and decreasing the radial size of the electric drive module 100, making the size of the electric drive module 100 smaller.

In at least one embodiment, the supporter 20 can be detachably connected to the housing 10, so the supporter 20, the rolling piece 21, and the rigid gear 111 can be detached as one unit. In other embodiments, the supporter 20 and the housing 10 can be integrated, which is not limited.

In addition, the supporter 20 can be arranged near the opening 101 can be known as the supporter 20 can be arranged on the inside of the opening 101 of the housing 10 and in the receiving chamber 102 of the housing 10, or on the outside of the opening 101 and outside of the housing 10. In the embodiment as shown in the figures, the supporter 20 is arranged on the top of the opening 101 and outside of the receiving chamber 102. In other embodiments, the supporter 20 can be covered by the housing 10, which are not limited here.

In the embodiment as shown in the figures, the supporter 20 can be arranged on the outside of the rigid gear 111 and completely wrap and cover the rigid gear 111. In other embodiments, in order to decrease the weight of the electric drive module 100, the top portion of the rigid gear 111 can also be set to protrude from the edge of the supporter 20, while the bottom portion of the rigid gear 111 can be set to be lower than the supporter and contained in the support 20. Thus, by partially removing of the top portion of the supporter 20 and partially removing of the bottom portion of the rigid gear 111, the weight of the entire electric drive module 100 can be effectively reduced while ensuring that the support 20 can support the rotation of the rigid gear 111.

In addition, in at least one embodiment, the supporter 20 can be arranged between the rigid gear 111 and the housing 10, an end of the supporter 20 can be fixedly connected to the housing 10, and the other end of the supporter 20 can be rotatably fixed on the rigid gear 111. For instance, in at least one embodiment, the supporter 20 can be annular and fixed on the housing 10, the supporter 20 can form annular slot, at the bottom of the rigid gear 111, an annular protrusion matched with the annular slot is formed to support the rotation of the rigid gear 111. For instance, in at least one embodiment, the supporter 20 can be a bearing and be arranged near the opening 101, then the outer ring of the supporter 20 can be fixed together with the housing 10 by welding, and the inner ring of the supporter 20 can be fixed together with the rigid gear 111 by welding.

In at least one embodiment, the circumferential surface of the supporter 20 can be aligned with the circumferential surface of the housing 10.

Thus, the appearance of the electric drive module 100 can be more regular as well as compact.

Referring to FIGS. 3 to 5, in at least one embodiment, the force output assembly 11 further comprises a flange plate 112 fixedly connected to the rigid gear 111, the flange plate 112 can be mounted near the opening 101 and covers the rigid gear 111, the flexible gear 12, and the cam 162.

Thus, on one hand, the flange plate 112 can efficiently increase the contact area of the force output assembly 11 and external loads, or increase the number of the connection points which can improve the connection strength, and ensure the stability of the mechanotransduction. On the other hand, the flange plate 112 covering the rigid gear 111 and the flexible gear 12 can efficiently protect the rigid gear 111 and the flexible gear 12 and prevent foreign matter and dust from entering the electric drive module 100 that might affect the stability of the mechanotransduction.

Referring to FIG. 4, the flange plate 112 can be fixedly connected to an axial side of the rigid gear 111, which can be axial connection. The rigid gear 111 and the flange plate 112 are respectively provided with fixing holes along the axial direction and are fixedly connected with each other by bolts, screws, pins and other fasteners, force can be output through the fasteners installed axially. In this situation, external loads applied to the flange plate 112 can extend along the axial direction to be fixedly connected to the flange plate 112 in the axial direction.

Figure 13:
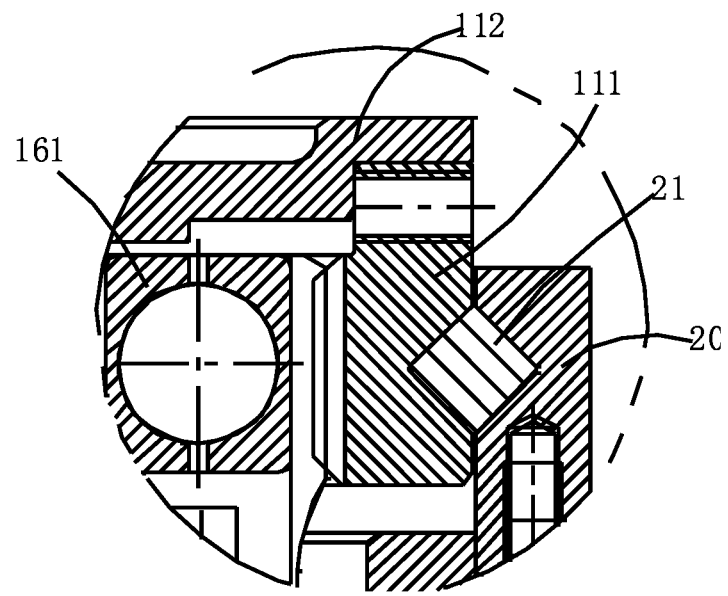
FIG. 13 illustrates a schematic diagram of at least one embodiment of a joint structure of the rigid gear and the supporter of the electric drive module according to the present disclosure.

Referring to FIG. 13, in other embodiments, the flange plate 112 can be fixedly connected with the radial side of the rigid gear 111. In this embodiment, the rigid gear 111 is provided with fixing holes 1112 along the radial direction for the fasteners to fixedly connect the rigid gear 111 and the flange plate 112. Thus, the rigid gear 111 outputs force to the flange plate 112 in the radial direction to drive the flange plate 112 to rotate, the force output direction is perpendicular to the rotating axis of the rigid gear 111, which can efficiently ensure the stability and reliability of the force output. In at least one embodiment, external loads connected to the flange plate 112 can be fixedly connected to the flange plate 112 or the rigid gear 111 along the radial direction of the flange plate 112 and the rigid gear 111.

Referring to FIGS. 3 to 5, in at least one embodiment, the first magnetic piece 171 of the first position detection assembly 17 is arranged on the side where the cam 162 is far away from the rotor 14 and the first magnetic piece 171 is mounted on the flange 112. The first sensing piece 172 is fixedly mounted on the central shaft 105 and is also positioned on the side where the cam 162 is far away from the rotor 14. That is, the entire first position detection assembly 17 is fully positioned on the side where the cam 162 is far away from the rotor 14. In at least one embodiment, the first position detection assembly 17 can be arranged in the space between the cam 162 and the flange plate 112.

In at least one embodiment, the flange plate 112 forms protrusion inserting into the annular chamber 1620 of the cam 162, the first magnetic piece 171 is mounted on the protrusion, the first sensing piece 172 is fully received in the annular chamber 1620 of the cam 162, so the entire first position detection assembly 17 can be received in the annular chamber 1620 of the cam 162, thereby decreasing the stacking space of the entire electric drive module 100 and decreasing the height and the size of the electric drive module 100.

In at least one embodiment, the second magnetic piece 191 of the second position detection assembly 19 is received in the annular chamber 1620 of the cam 162, the second sensing piece 192 is positioned in the space between the cam 162 and the flange plate 112. It can be understood that in other embodiments, the second position detection assembly 19 is fully arranged in the space between the cam 162 and the flange plate 112 or arranged inside or outside of the rotor 14 to detect the rotation position of the rotor 14.

Furthermore, referring to FIGS. 3 to 5, in at least one embodiment, the electric drive module 100 further comprises a first support bearing 22, the housing 10 comprises the central shaft 105. The first support bearing 22 is arranged between the central shaft 105 and the rotor 14, or the first support bearing 22 is arranged between the central shaft 105 and the cam 162, or one part of the first support bearing 22 can be arranged between the central shaft 105 and the rotor 14, the other part of the first support bearing 22 can be arranged between the central shaft 105 and the cam 162. The first support bearing 22 is configured to support the cam 162 and/or the rotor 14 and the central shaft 105 in a relative rotation state.

Thus, the first support bearing 22 can support the rotation of the rotor 14 and the cam 162 to ensure the stability of the rotation.

In detail, in at least one embodiment, the first position detection assembly 17 is positioned on the top of the first support bearing 22, which can facilitate the replacement or maintenance of the first position detection assembly 17. That is, along the axial direction, the first support bearing 22 and the first position detection assembly 17 are spaced apart from each other, the first position detection assembly 17 is positioned above the first support bearing 22, when the first position detection assembly 17 needs to be replaced or repaired, the first position detection assembly 17 can be exposed by simply removing the flange 112 and the rigid wheel 111 to facilitate disassembly and assembly.

In at least one embodiment, the first support bearing 22 can be arranged on the central shaft 105, the outer ring of the first support bearing 22 can be fixedly connected with the cam 162 and/or the rotor 14 by welding or interference fit, etc., the inner ring of the first support bearing 22 can be fixedly connected with the central shaft 105 by welding or interference fit, etc.

Referring to FIGS. 4 to 6, in at least one embodiment, the electric drive module 100 further comprises a second support bearing 23, the second support bearing 23 is arranged between the force output assembly 11 and the cam 162. The second support bearing 23 is configured to support the force output assembly 11 and the cam 162 in a relative rotation state.

Thus, the second support bearing 23 can rotatably support the cam 162 and support the rotation of the flange plate 112, it is unnecessary to set additional support bearings to support the flange plate 112, which can decrease components and the cost. In detail, in at least one embodiment, the second support bearing 23 can be arranged between the flange plate 112 and the cam 162, and the second support bearing 23 can be a unidirectional push bearing.

Referring to FIG. 4, in at least one embodiment, there can be a wave spring between the second support bearing 23 and the flange plate 112. The wave spring can provide a constant pressure to the second support bearing 23, so as to control the size between the first magnetic piece 171 arranged on the flange plate 112 and the second circuit board 1721.

Referring to FIGS. 3 to 5 and 10, in at least one embodiment, the electric drive module 100 further comprises a mounting rack 24, the stator 13 is mounted on the mounting rack 24 and fixedly connected to the housing 10 or the flexible gear 12 through the mounting rack 24. Thus, the mounting rack 24 can efficiently and stably support the stator 13.

In detail, in at least one embodiment, the mounting rack 24 can be arranged above the mounting wall 122. The mounting rack 24, the mounting wall 122, and the housing can be directly fixedly connected together by fasteners, such as bolts, screws, pins, etc. Thus, the mounting rack 24 can press against the mounting wall 122, so as to improve resistance against deformation and effectively avoid the cracking of the flexible gear 12.

Referring to FIGS. 4, 5, and 10, in at least one embodiment, the electric drive module 100 further comprises a third support bearing 26, the third support bearing 26 can be arranged between the rotor 14 and the mounting rack 24. The third support bearing 26 is configured to support the rotor 14 and the mounting rack 24 in a relative rotation state.

Thus, the third support bearing 26 can stably support the relative rotation of the rotor 14 and the mounting rack 24, to ensure the rotation stability of the rotor 14. In detail, in at least one embodiment, the mounting rack 24 can be located at the end of the rotor 14, the third support bearing 26 can be mounted on the end of the rotor 14 and the mounting rack 24. For example, the outer ring of the third support bearing 26 can be fixed to the mounting rack 24, and the inner ring of the third support bearing 26 can be fixed to the rotor 14.

Referring to FIG. 6, in at least one embodiment, the third support bearing 26 may not be arranged between the rotor 14 and the mounting rack 24, but the third support bearing 26 may be arranged between the rotor 14 and the central shaft 105, the third support bearing 26 and the first support bearing 22 are spaced apart relatively. In this situation, the inner wall of the rotor 14 can form a receiving chamber, at least part of the stator 13 can be received in the receiving chamber, the third support bearing 26 can be arranged between a part of the rotor 14 closes to the central shaft 105 and the central shaft 105.

Referring to FIGS. 4 to 9, in at least one embodiment, there is a fourth circuit board 25 between the stator 13 and the mounting rack 24 for providing power to the stator 13.

In detail, the stator 13 further comprises a stator winding (not shown) surrounding the stator core, the stator winding can be electrically connected to the fourth circuit board 25, so the fourth circuit board 25 can be further electrically connected to the first circuit board 18. When powered, the stator winding will generate a driving force to drive the rotor 14 to rotate relative to the housing 10.

In at least one embodiment, the bottom wall 103 can be provided with a wiring hole 107. Similarly, the mounting protrusion 1221 can be provided with a wiring hole 107. The fourth circuit board 25 can be electrically connected to the first circuit board 18 through connecting wires inserted through the wiring hole 107, so the fourth circuit board 25 can be electrically connected to external circuits without additional complicated wiring, which can save wiring space and further decrease the size of the electric drive module 100.

In at least one embodiment, insulating sheet (not shown) can also be arranged between the fourth circuit board 25 and the mounting rack 24. Thus, the insulating sheet can isolate the fourth circuit board 25 and the mounting rack 24 to avoid shorting circuit of the stator 13 caused by electrical contact between the fourth circuit board 25 and the mounting rack 24. In at least one embodiment, when the mounting rack 24 is made of insulating material, the insulating sheet can be omitted. In at least one embodiment, the fourth circuit board 25 can be omitted, the stator winding can be electrically connected to the first circuit board 18, which is not limited here.

In at least one embodiment, the first circuit board 18 can be the power supply circuit board for the whole electric drive module 100, the first circuit board 18 can be plugged with the drive circuit board 30 through a connector 35. The first circuit board 18 is configured to supply power to each element in the electric drive module 100 and transmit control and detection signals. The first circuit board 18 can be arranged in the receiving space 109 under the bottom wall 103, which is located outside of the receiving chamber 103.

The second circuit board 1721 can be the support circuit board of the first position detection assembly 17, the third circuit board 1921 can be the support circuit board of the second position detection assembly 19. The second circuit board 1721 and the third circuit board 1921 can be electrically connected to the first circuit board 18 through connecting wires received in the wire slot 1051. The second circuit board 1721 and the third circuit board 1921 can be integrated in one circuit board and electrically connected to the first circuit board 18, or the second circuit board 1721 and the third circuit board 1921 can be omitted, the first sensing unit 1722 and the second sensing unit 1922 can be electrically connected to the first circuit board 18 through connecting wires.

The fourth circuit board 25 can be a stator circuit board and is configured to provide power for the stator winding of the stator 13 for driving the rotor 14 to rotate. The fourth circuit board 25 can be electrically connected to the first circuit board 18 through connecting wires, when the drive circuit board 30 receives control instructions transmitted by the processor of the robot, the first circuit board 18 and the fourth circuit board 25 can control the status of the stator 13 to control the rotating speed of the rotor 14. It should be known that, in at least one embodiment, the fourth circuit board 25 can be omitted, the stator winding of the stator 13 can be electrically connected to the first circuit board 18 through connecting wires.

Referring to FIG. 4, in at least one embodiment, the central shaft 105 is formed with a plurality of shaft shoulders. The second circuit board 1721 and the third circuit board 1921 can be mounted on the shaft shoulders of the central shaft 105. In at least one embodiment, the central shaft 105 completely penetrates the entire housing 10, the connecting wires 33 received in the wire slot 1051 can enter the central shaft 105 and then electrically connect to the first circuit board 18 directly.

Figure 14:
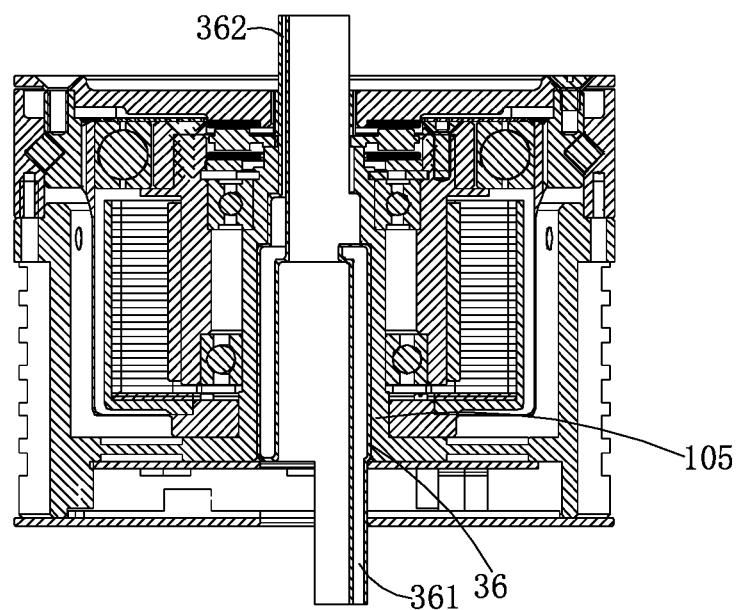
FIG. 14 illustrates another cross-sectional schematic diagram of at least one embodiment of the electric drive module according to the present disclosure.

Referring to FIG. 14, in at least one embodiment, the central shaft 105 can be provided with colling liquid circuiting pipe 36 therein. The colling liquid circuiting pipe 36 has an inlet 361 and an outlet 362. During the cooling process, the colling liquid is driven by external cooling pump to circulate in the colling liquid circuiting pipe 36 to dissipate heat, so as to prevent the excessive concentration of the heating components of the electric drive module 100 from poor heat dissipation. As shown in FIG. 14, the inlet 361 is on the bottom of the electric drive module 100, the outlet 362 is on the top of the electric drive module 100. In at least one embodiment, positions of the inlet 361 and the outlet 362 can be exchanged, or the inlet 361 and the outlet 362 can both be located on the bottom or the top of the electric drive module 100, which is not being limited here.

Referring to FIGS. 4 and 5, in at least one embodiment, the housing 10 further comprises a cover 31 on the bottom. The cover 31 covers the receiving space 109 of the bottom wall 103 of the housing 10, and the drive circuit board 30 and the first circuit board 18 are received in the receiving space 109. Thus, the cover 31 can protect the drive circuit board 30 and the first circuit board 18, and also play a role of dust prevention.

Figure 15:
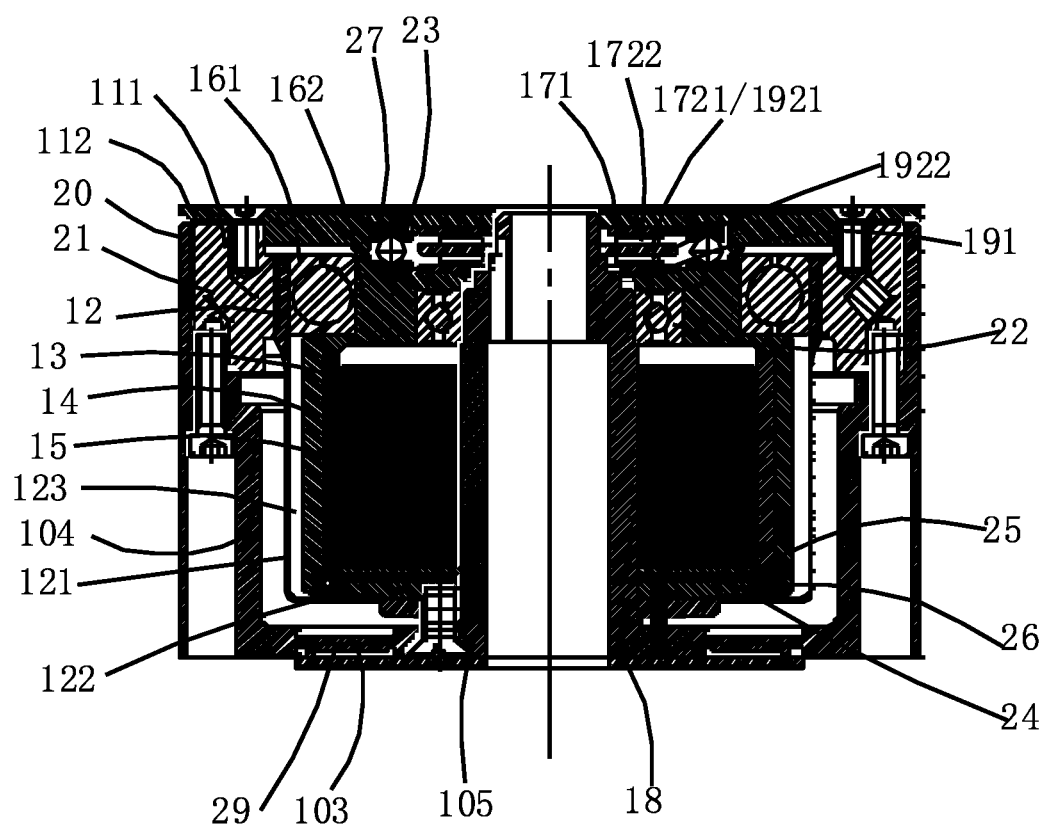
FIG. 15 illustrates another cross-sectional schematic diagram of at least one embodiment of the electric drive module according to the present disclosure.

Referring to FIG. 15, in at least one embodiment, the receiving space 109 can be omitted from the housing 10, the first circuit board 18 can be attached under the bottom wall 103, so as to decrease the overall height of the housing 10 to further decrease the size of the entire electric drive module 100. In this situation, the drive circuit board 30 can be arranged externally, such as being arranged on the body 200 of the robot and electrically connected to the first circuit board 18 through connecting wires.

Referring to FIGS. 3, 4, to 8, in at least one embodiment, the electric drive module 100 further comprises torque sensor 29, the housing 10 comprises the bottom wall 103, the bottom wall 103 is provided with a groove 1031, and the torque sensor 29 is mounted in the groove 1031. The torque sensor 29 is configured to detect output torque of the rigid gear 111.

Thus, the torque sensor 29 can directly be mounted on the housing 10, the torque of the rigid gear 111 can directly act on the torque sensor 29 after passing through the flexible gear 12 and the housing 10, the torque detected by the torque sensor 29 is the torque of the rigid gear 111, which is precision and reliable. Meanwhile, the torque sensor 29 is arranged in the groove 1031 of the bottom wall 103 of the housing 10 to facilitate the assembly of the torque sensor 29, the overall structure is compact, and the torque sensor 29 can also be protected.

In detail, in at least one embodiment, the torque received by the rigid gear 111 acts on the flexible wall 121 of the flexible gear 12, and further act on the bottom wall 103 of the housing 10 through the mount wall 122, so as to transmit force to the torque sensor 29 mounted on the bottom wall 103 for detecting the torque.

In at least one embodiment, the groove 1031 is formed on the bottom of the bottom wall 103 of the housing 10, the torque sensor 29 is mounted in the groove 1031, the first circuit board 18 is mounted on the bottom wall 103 and covers the torque sensor 29, and the torque sensor 29 is electrically connected with the first circuit board 18. The torque sensor 29 may preferably be a strain gage torque sensor 29, which is small in size and mounted in the groove 1031 of the bottom wall 103, to decrease the overall size of the electric drive module 100.

In addition, in at least one embodiment, the material of the portion corresponding to the groove 1031 on the bottom wall 103 may be different from the material of other portions of the housing 10. Compared with other parts, the portion corresponding to the groove 1031 can be made more easily deformable for easier detection of torque by the torque sensor 29, which can improve the detecting precision.

Referring to FIGS. 2 to 5, 16, 19, and 20, in at least one embodiment, the electric drive module 100 comprises the housing 10, the force output assembly 11, the flexible gear 12, the stator 13, the rotor 14, the wave generator 16, and the cooling pipe. The housing 10 is provided with the opening 101 and the receiving chamber 102, the force output assembly 11 can rotate relative to the housing 10, the force output assembly 11 comprises the rigid gear 111 arranged near the opening 101.

At least part of the flexible gear 12 is arranged in the receiving chamber 102 and is dynamically coupled to the rigid gear 111. The flexible gear 12 is further fixedly connected to the housing 10. At least part of the rotor 14 is rotatably mounted in the receiving chamber 102 of the housing 10. On the inner side of the rotor 14 is installed with the magnet 15, the rotor 14 and the rigid gear 111 can rotate coaxially. At least part of the stator 13 is received in the rotor 14, the stator 13 and the magnet 15 are spaced apart relatively.

The wave generator 16 comprises the flexible bearing 161 and the cam 162. The flexible bearing 161 is arranged between the flexible gear 12 and the cam 162. The cam 162 is detachably mounted on the rotor 14 and integrated with the rotor 14.

The stator 13 is configured to drive the rotor 14 to rotate relative to the housing 10, and when the rotor 14 rotates, the wave generator 16 drives the flexible gear 12 to deform and drive the rigid gear 111 to rotate and output force.

In detail, the housing 10 also comprises the enclosure wall 104, the central shaft 105, and the bottom wall 103 connecting the enclosure wall 104 and the central shaft 105. The enclosure wall 104 and the bottom wall 103 cooperatively enclose the receiving chamber 102. The mounting wall 122 is fixedly connected to at least one of the enclosure wall 104, the central shaft 105, and the bottom wall 103. The central shaft 105 protrudes from the bottom wall 103 and extends towards the opening 101. At least part of the cooling pipe is received in and is close to the stator 13.

At present, in related technology, electrical motor of the joints of the robot mostly uses natural heat dissipation or fan heat dissipation, as torque density of the electrical motor of the joints increases, the natural heat dissipation or fan heat dissipation cannot meet the current joint heat dissipation requirements, coolant has a better heat dissipation ability. However, most of the pipe of coolant is arranged on the surface of the housing, and the stator temperature is high, the coolant on the shell surface cannot directly cool down the stator, that is, the coolant circulating on the surface of the housing has limited heat dissipation effect on the stator. In the electric drive module 100 of the present disclosure, at least part of the cooling pipe 80 is received in the inner side of the stator 14, the cooling pipe 80 is closed to the stator 14, and the heat generated by the stator 14 is rapidly transmitted to the coolant, which can prevent the insulation structure of the generator 20 from being damaged by the high temperature of the stator 14 and extend service life of the electric drive module 100.

Figure 16:
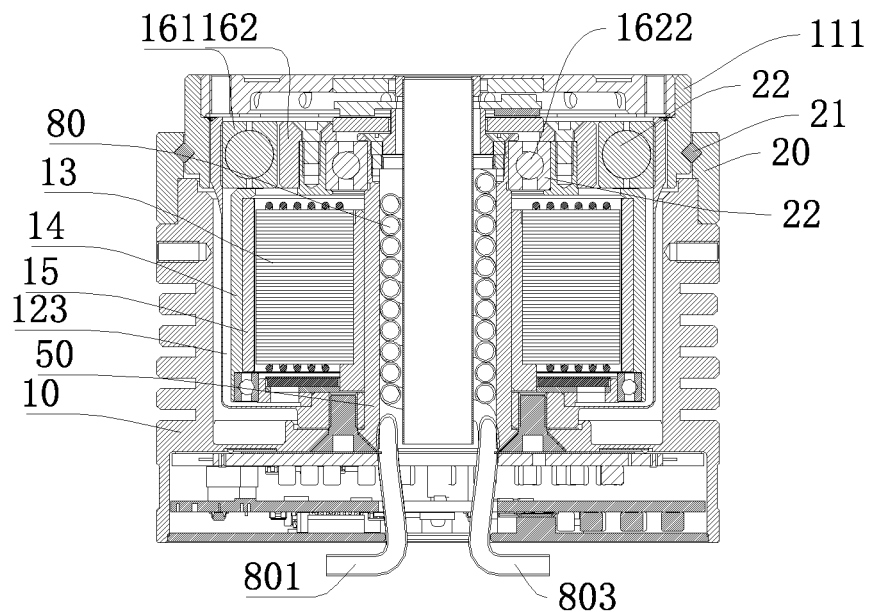
FIG. 16 illustrates another cross-sectional schematic diagram of at least one embodiment of the electric drive module according to the present disclosure.
Figure 17:
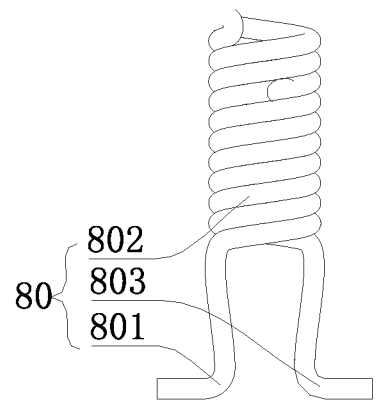
FIG. 17 illustrates a schematic diagram of at least one embodiment of a cooling line according to the present disclosure.
Figure 18:
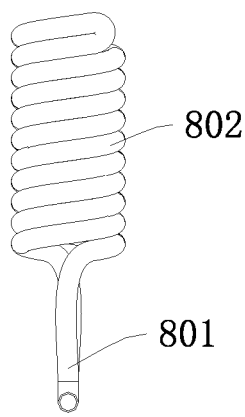
FIG. 18 illustrates another schematic diagram of at least one embodiment of the cooling line according to the present disclosure.
Figure 19:
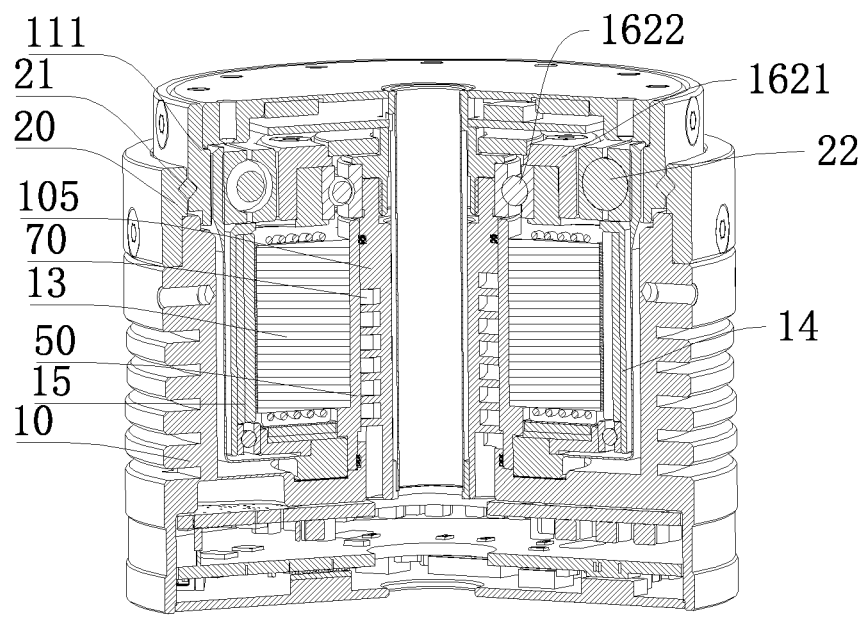
FIG. 19 illustrates another cross-sectional schematic diagram of at least one embodiment of the electric drive module according to the present disclosure.
Figure 20:
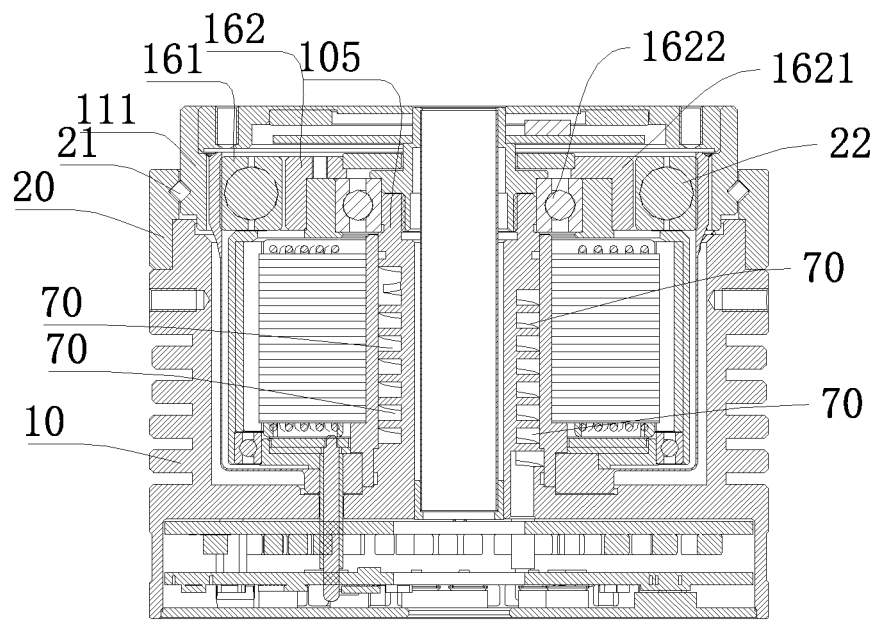
FIG. 20 illustrates another cross-sectional schematic diagram of at least one embodiment of the electric drive module according to the present disclosure.
Figure 21:
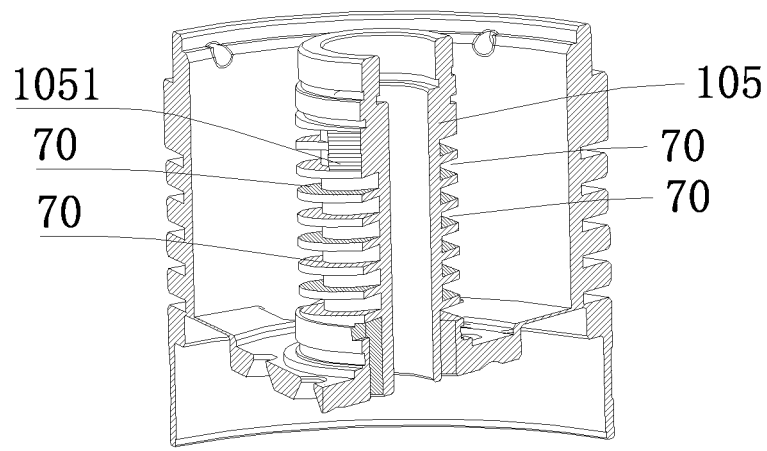
FIG. 21 illustrates another cross-sectional schematic diagram of at least one embodiment of the electric drive module according to the present disclosure.

Referring to FIGS. 16 to 18, in at least one embodiment, the cooling pipe and the central shaft 105 are independent from each other. For instance, the cooling pipe can be a cooling pipe 80 wound around the central shaft 105. In detail, the cooling pipe 80 comprises an inlet section 801, a wound section 802, and an outlet section 803. The wound section 802 is close to or directly contacts with the central shaft 105, or contacts the central shaft 105 through a heat dissipating piece. The bottom wall 103 is respectively provided with a first hole 1031 and a second hole 1032. The inlet section 801 passes through the first hole 1031, the outlet section 803 passes through the second hole 1032. That is, the inlet section 801 of the cooling pipe 80 through the first hole 1031 enters into the electric drive module 100, the cooling pipe 80 is spirally wound along the axis of the central shaft 105, the wound section 802 preferably clings to the inner wall of the central shaft 105. Since the main role of the wound section 802 is to cool the stator 14, the axial length of the wound section 802 is preferably greater than or equal to the axial length of the projection of the stator 14 along the radial direction, The cooling pipe 80 passes through the electric drive module 100 through the second through-hole 1032 to form the outlet section 803. In at least one embodiment, the inlet section 801 and the outlet section 803 are located on the same side of the electric drive module 100. In other embodiments, the inlet section 801 and the outlet section 803 can be located on the opposite sides of the electric drive module 100. Additionally, for better routing, the electric drive module 100 further comprises a wiring barrel (not shown), the wiring barrel and the central shaft 105 clamp part of the cooling pipe in the middle, and the signal wires and the power wires can be pass through the wiring barrel.

Thus, the coolant can flow along the inlet section 801 to the wound section 802, and then to the outlet section 803 through the wound section 802. The flow directions of the coolant in the two adjacent cooling pipes 80 is opposite, which can ensure the temperature balance of the entire cooling pipe 80, and prevent local overheating, so as to rapidly cool the structural parts in the electric drive module 100, especially for the stator 14 with more heat, the flowing coolant can enhance the heat dissipation effect on the stator 14. In addition, the cooling pipe 80 adopts the inlet and outlet at the same side can improve the heat dissipation effect and compact the structure of the electric drive module 100, and further to decrease the size of the electric drive module 100. It should be noted that the winding method of the cooling pipe 80 is not limited, and other winding methods can be selected according to the specific use of the electric drive module 100, as long as it can meet the heat dissipation requirements. The density of windings of the cooling pipe 80 is not limited and can be designed according to heat dissipation requirements.

Referring to FIGS. 19 to 24, in at least one embodiment, the electric drive module 100 further comprises a sleeve 50, which is sleeved on the central shaft 105. The sleeve 50 can be sleeved on the outer circumferential wall or inner circumferential wall of the central shaft 105. For the convenience of description, the present application describes that the sleeve 50 is sleeved on the circumferential wall of the central shaft part. after the sleeve 50 is matched with the central shaft 105, the cooling pipe is defined between the central shaft 105 and the sleeve 50. A wall of the sleeve 50 contacting the central shaft 105 is provided with a first flow channel groove. The cooling pipe is defined between the inner wall of the first flow channel groove and the outer circumferential wall of the central shaft 105. Alternatively, a wall of the central shaft 105 contacting the sleeve 50 is provided with a second flow channel groove 70. The cooling pipe is defined between the inner wall of the second flow channel groove 70 and the inner circumferential wall of the sleeve 50. Alternatively, a wall of the central shaft 105 contacting the sleeve 50 is provided with a second flow channel groove 70. A wall of the sleeve 50 contacting the central shaft 105 is provided with a first flow channel groove, and the first flow channel groove and the second flow channel groove 70 are opposite to each other and have the same extension direction. The inner wall of the first flow channel and the inner wall of the second flow channel 70 are mutually provide the cooling pipe.

In other words, the cooling pipe can be formed by structures of the electric drive module 100 itself, for example, the electric drive module 100 further comprises the sleeve 50, which can be a steel sleeve. The sleeve 50 is sleeved on the central shaft 105, the central shaft 105 and the sleeve 50 are part of the cooling pipe. In detail, when only the first flow channel is arranged on the wall of the sleeve 50, the central shaft 105 and the sleeve 50 cooperatively define the cooling pipe, the central shaft 105 can prevent the coolant from flowing out of the cooling pipe. When only the second flow channel 70 is arranged on the central shaft 105 wall where the central shaft 105 contacts the sleeve 50, the central shaft 105 and the sleeve 50 cooperatively provide the second flow channel groove 70, the sleeve 50 can prevent the coolant from flowing out of the second flow channel groove 70. When the central shaft 105 is provided with the second flow channel groove 70, and the wall of the sleeve 50 is provided with the first flow channel groove, the two flow channel grooves cooperatively provide the cooling pipe. Thus, the electric drive module 100 can provide the cooling pipe within its own structure, without adding a new structure to the original structure of the electric drive module 100, this makes the structure of the electric drive module 100 more simple and compact. Meanwhile, the cooling pipe is close to the stator 13 for rapid heat dissipation.

Referring to FIGS. 19 to 24, in at least one embodiment, when the central shaft 105 and the sleeve 50 provide the cooling pipe, the specific structures of the first flow channel groove and the second flow channel groove 70 are not limited. For instance, the first flow channel groove and/or the second flow channel groove 70 may comprise a plurality of circumferential sections 701 and a plurality of axial sections 702. A plurality of circumferential sections 701 surround the axis of rotation of rotor 14, a plurality of axial sections 702 extend along the axis of rotation of rotor 14 are arranged, the circumferential sections 701 are arranged at intervals in the axial direction of rotation of rotor 14, two adjacent circumferential sections 701 are connected by an axial section 702. Thus, the coolant flows from the inlet on the bottom wall 103 to the flow channel, and further flows around the central shaft 105 to the top portion of the central shaft 105, the central shaft 105 has a reversing area 1051 at the top portion. The coolant changes the flow direction in the reversing area 1051, and flow around the central shaft 105 to the bottom of the central shaft 105, and then flows out through the water outlet to complete the heat dissipation cycle. The inlet and the outlet are spaced apart, so as to ensure the overall heat distribution of the cooling pipe is even, avoid local overheating, and improve heat dissipation efficiency.

Figure 22:
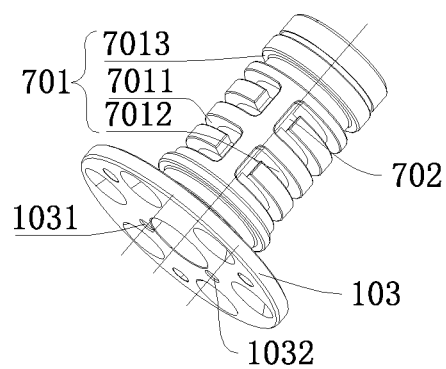
FIG. 22 illustrates a schematic diagram of at least one embodiment of a second flow channel according to the present disclosure.
Figure 23:
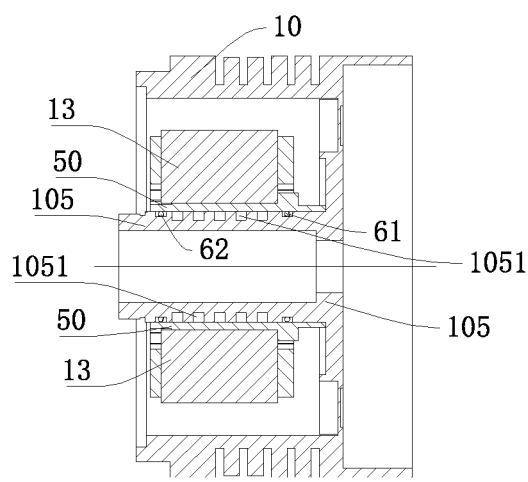
FIG. 23 illustrates another cross-sectional schematic diagram of at least one embodiment of the electric drive module according to the present disclosure.
Figure 24:
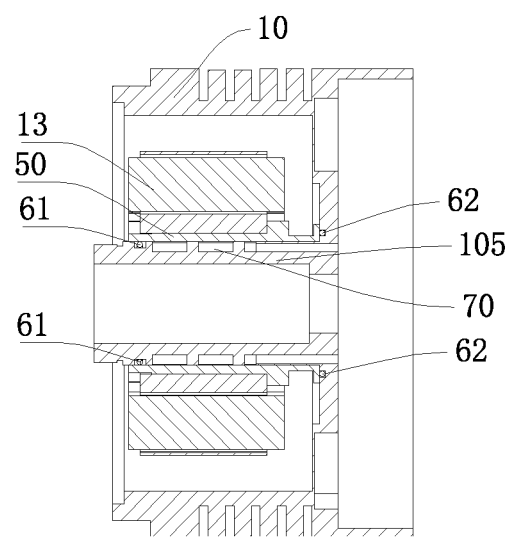
FIG. 24 illustrates another cross-sectional schematic diagram of at least one embodiment of the electric drive module according to the present disclosure.

Referring to FIGS. 22 to 24, in at least one embodiment, the circumferential section 701 further comprises a first circumferential section 7011, a second circumferential section 7012, and a third circumferential section 7013. There can be a plurality of first circumferential sections 7011 and a plurality of second circumferential sections 7012, the first circumferential sections 7011 are set correspond to the second circumferential sections 7012, the first circumferential sections 7011 and the corresponding second circumferential sections 7012 are located in the same plane perpendicular to the axis of the central shaft 105. A plurality of first circumferential sections 7011 and a plurality of the second circumferential sections 7012 are arranged at intervals along the axial direction of the central shaft 105. The third circumferential section 7013 is positioned on the side of the first circumferential sections 7011 and the second circumferential sections 7012 away from the bottom wall 103. That is, the circumferential section 701 is designed in sections, the coolant flowing from the inlet to the first circumferential sections 7011, through the axial section 702 to the next adjacent first circumferential section 7011, through another axial section 702 to the next adjacent first circumferential section 7011, and so on, until the coolant flows into the third circumferential section 7013 around the rotating axis of the rotor 14. The coolant further flows from the third circumferential section 7013 to the second circumferential section 7012, then it flows into the next adjacent second circumferential section 7012 via the axial section 702, and so on, until the coolant flows into the outlet connected with the second circumferential section 7012, so as to complete the heat dissipation cycle. Thus, the flow channel occupies a small size in the central shaft 105 and/or the sleeve 50, to meet heat dissipation requirements, and maintain stiffness of the central shaft 105 and/or the sleeve 50.

Referring to FIGS. 23 and 24, in at least one embodiment, the electric drive module 100 further comprises a first seal 61 and a second seal 62. The first seal 61 is positioned between the central shaft 105 and the sleeve 50, the second seal 62 is positioned between the central shaft 105 and the sleeve 50 or the second seal 62 can be positioned between the sleeve 50 and the bottom wall 103, and the first flow channel groove or the second flow channel groove 70 are positioned between the first seal 61 and the second seal 62. When the seal is positioned between the central shaft 105 and the sleeve 50, it is a radial seal; when the seal is positioned between the sleeve 50 and the bottom wall 103, it is an axial seal. That is, the sealing of the cooling pipe can be executed by two radial seals (as shown in FIG. 23), or by one radial seal and one axial seal (as shown in FIG. 24). Thus, the seals can prevent the coolant in the cooling pipeline from leaking, and the sealing structure is simple, and the reliability is higher. The types of the first seal 61 and the second seal 62 are not limited, these can be O-shaped sealing rings.

The present disclosure further provides an electric drive equipment 1000 including the electric drive module 100. For instance, the electric drive equipment 1000 can be a robot, the electric drive module 100 can be mounted at the joint of the robot. Since the stator 13 generates great heat, the cooling pipeline can directly dissipate heat from stator 13 to improve the heat dissipation effect. Additionally, the electric drive module 100 has compact structure, small volume and high reliability.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. An electric drive module comprising:
   a housing, the housing comprising an opening and a receiving chamber;
   a force output assembly, the force output assembly being capable of rotating relative to the housing and comprising a rigid gear arranged near the opening;
   a flexible gear, at least part of the flexible gear is received in the receiving chamber and is dynamically coupled to the rigid gear, the flexible gear is further fixedly connected to the housing;
   a rotor, at least part of the rotor is rotatably mounted in the receiving chamber, the rotor comprising a magnet therein, the rotor and the rigid gear being capable of rotating coaxially;
   a stator, at least part of the stator is received in the rotor, the stator and the magnet are spaced apart relatively; and
   a wave generator, the wave generator comprises a flexible bearing and a cam, the flexible bearing is arranged between the flexible gear and the cam, the cam is detachably mounted on the rotor or integrated with the rotor;
   a supporter, the supporter is arranged close to the opening, at least part of the rigid gear is arranged at the internal side of the supporter, a rolling piece is arranged between the rigid gear and the supporter, the rigid gear is capable of rotating relative to the supporter; the supporter is detachably connected to the housing; or the supporter is integrated with the housing;
   wherein the stator is configured to drive the rotor to rotate relative to the housing, when the rotor rotates, the wave generator drives the flexible gear to deform to drive the rigid gear to rotate.

2. The electric drive module according to claim 1, further comprising a first position detection assembly, wherein at least part of the first position detection assembly is received in an annular chamber formed by the cam or arranged on a side of the wave generator away from the stator, the first position detection assembly is configured to detect rotation position information of the force output assembly.

3. The electric drive module according to claim 2, wherein the first position detection assembly comprises a first magnetic piece and a first sensing piece; the first magnetic piece is fixedly connected to the force output assembly, the housing comprises a central shaft, the first sensing piece is arranged on the central shaft, the first sensing piece is fixedly connected to the housing, the first sensing piece and the first magnetic piece are spaced apart relatively; the central shaft is provided with a wire slot, the first sensing piece is electrically connected to a first circuit board through wires received in the wire slot.

4. The electric drive module according to claim 3, wherein the first sensing piece comprises a second circuit board and a first sensing unit; the second circuit board is electrically connected to the first sensing unit, the first sensing unit and the first magnetic piece are spaced apart relatively, the second circuit board is arranged on the central shaft and is electrically connected to the first circuit board through wires received in the wire slot.

5. The electric drive module according to claim 4, further comprising a second position detection assembly, wherein the second position detection assembly is arranged on a side of the first position detection assembly facing the direction of the stator; the second position detection assembly comprises a second magnetic piece and a second sensing piece, the second magnetic piece is fixed connected to the rotor and rotates with the rotor synchronously, the second sensing piece is fixedly connected to the housing, the second sensing piece and the second magnetic piece are spaced apart relatively, the second sensing piece is configured to detect rotation positions of the second magnetic piece.

6. The electric drive module according to claim 5, wherein the second sensing piece comprises a third circuit board and a second sensing unit; the second sensing unit is electrically connected to the third circuit board, the second sensing unit the second magnetic piece are spaced apart relatively, the third circuit board and the second circuit board are spaced apart relatively, and the third circuit board is fixedly connected to the housing.

7. The electric drive module according to claim 1, wherein an outline of an orthographic projection of the cam in an axial direction of the rotor rotation is oval;
   the flexible gear is formed with a mounting chamber, at least part of the rotor and the stator are received in the mounting chamber.

8. The electric drive module according to claim 7, wherein the flexible gear comprises a flexible wall and a mounting wall, the mounting wall is connected to the flexible wall, the flexible wall extends along the axial direction of the rotor rotation; the mounting wall is fixedly connected to the housing;

the flexible wall and the mounting wall cooperatively form the mounting chamber, the rotor and the stator are fully received in the mounting chamber;

or the flexible wall forms the mounting chamber, at least part of the rotor and the stator are received in the mounting chamber.

9. The electric drive module according to claim 8, wherein the housing comprises an enclosure wall, a central shaft, and a bottom wall; the bottom wall is connected with the enclosure wall and the central shaft, the enclosure wall and the bottom wall cooperatively enclose to form the receiving chamber, the mounting wall of the flexible gear is fixedly connected with at least one of the enclosure wall, the bottom wall, and the central shaft.

10. The electric drive module according to claim 1, wherein the force output assembly further comprises a flange plate fixedly connected to the rigid gear, the flange plate is mounted near the opening and cover the rigid gear, the flexible gear, and the cam;

the flange plate is fixedly connected to a radial side or an axial side of the rigid gear.

11. The electric drive module according to claim 1, further comprising a first support bearing and a second support bearing, wherein the housing comprises a central shaft, the first support bearing is arranged between the central shaft and the rotor; or the first support bearing is arranged between the central shaft and the cam; or one part of the first support bearing is arranged between the central shaft and the rotor, the other part of the first support bearing is arranged between the central shaft and the cam; the first support bearing is configured to support the cam and/or the rotor and the central shaft in a counterrotating status;

the second support bearing is arranged between the force output assembly and the cam; the second support bearing is configured to support the force output assembly and the cam in a counterrotating status.

12. The electric drive module according to claim 1, further comprising a mounting rack and a third support bearing;

wherein the stator is mounted on the mounting rack and fixedly connected to the housing or the flexible gear through the mounting rack; and the third support bearing is arranged between the rotor and the mounting rack, the third support bearing is configured to support the rotor and the mounting rack in a counterrotating status.

13. The electric drive module according to claim 1, further comprising a torque sensor;

the housing comprises a bottom wall, the bottom wall is provided with a groove, the torque sensor is mounted in the groove, the torque sensor is configured to detect an output torque of the rigid gear.

14. An electric drive equipment comprising one or more electric drive modules, wherein the electric drive module comprising:

a housing, the housing comprising an opening and a receiving chamber;

a force output assembly, the force output assembly being capable of rotating relative to the housing and comprising a rigid gear arranged near the opening;

a flexible gear, at least part of the flexible gear is received in the receiving chamber and is dynamically coupled to the rigid gear, the flexible gear is further fixedly connected to the housing;

a rotor, at least part of the rotor is rotatably mounted in the receiving chamber, the rotor comprising a magnet therein, the rotor and the rigid gear being capable of rotating coaxially;

a stator, at least part of the stator is received in the rotor, the stator and the magnet are spaced apart relatively; and a wave generator, the wave generator comprises a flexible bearing and a cam, the flexible bearing is arranged between the flexible gear and the cam, the cam is detachably mounted on the rotor or integrated with the rotor;

a supporter, the supporter is arranged close to the opening, at least part of the rigid gear is arranged at the internal side of the supporter, a rolling piece is arranged between the rigid gear and the supporter, the rigid gear is capable of rotating relative to the supporter; the supporter is detachably connected to the housing; or the supporter is integrated with the housing;

wherein the stator is configured to drive the rotor to rotate relative to the housing, when the rotor rotates, the wave generator drives the flexible gear to deform to drive the rigid gear to rotate.

15. The electric drive equipment according to claim 14, further comprising a robot, wherein the robot comprises a body and one or mor electric drive modules coupled to the body.

* * * * *